United States Patent
Evans et al.

(10) Patent No.: US 11,256,042 B2
(45) Date of Patent: Feb. 22, 2022

(54) WAVEGUIDE SUBSTRATES AND WAVEGUIDE SUBSTRATE ASSEMBLIES HAVING WAVEGUIDE ROUTING SCHEMES AND METHODS FOR FABRICATING THE SAME

(71) Applicant: CORNING RESEARCH & DEVELOPMENT CORPORATION, Corning, NY (US)

(72) Inventors: Alan Frank Evans, Beaver Dams, NY (US); Christian Fiebig, Berlin (DE); Claudio Mazzali, Painted Post, NY (US); James Scott Sutherland, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/030,834

(22) Filed: Sep. 24, 2020

(65) Prior Publication Data
US 2021/0011229 A1    Jan. 14, 2021

Related U.S. Application Data

(63) Continuation of application No. PCT/US2019/025295, filed on Apr. 2, 2019.
(Continued)

(51) Int. Cl.
*G02B 6/38* (2006.01)
*G02B 6/40* (2006.01)

(52) U.S. Cl.
CPC ........... *G02B 6/403* (2013.01); *G02B 6/3881* (2013.01); *G02B 6/3882* (2013.01)

(58) Field of Classification Search
CPC .......................... G02B 6/3881; G02B 6/3885
See application file for complete search history.

(56) References Cited

U.S. PATENT DOCUMENTS 5,343,544 A * 8/1994 Boyd .................. G02B 6/3652
                                                                385/46
6,754,429 B2   6/2004 Borrelli et al.
(Continued)

FOREIGN PATENT DOCUMENTS

CN    1381736 A    11/2002
CN    101576711 A    11/2009
(Continued)

OTHER PUBLICATIONS

CommScope, "Fiber Indexing", available online at <https://web.archive.org/web/20170903124659if_/http://www.commscope.com/Solutions/Fiber-Indexing/>, 2017, 3 pages.
(Continued)

*Primary Examiner* — Charlie Y Peng
(74) *Attorney, Agent, or Firm* — Grant A. Gildehaus

(57) ABSTRACT

Waveguide substrate, waveguide substrate assemblies and methods of fabricating waveguide substrates having various waveguide routing schemes are disclosed. In one embodiment, a waveguide substrate includes a first surface and a second surface, and a plurality of waveguides within the waveguide substrate. The plurality of waveguides defines a plurality of inputs at the first surface. A subset of the plurality of waveguides extends to the second surface to at least partially define a plurality of outputs at the second surface. In one waveguide routing scheme, at least one branching waveguide extends between one of the first surface and the second surface to a surface other than the first surface and the second surface. Another waveguide routing scheme arranges the plurality of waveguides into optical receive-transmit pairs for duplex pairing of optical signals.

32 Claims, 24 Drawing Sheets

Related U.S. Application Data

(60) Provisional application No. 62/652,264, filed on Apr. 3, 2018.

(56) References Cited

U.S. PATENT DOCUMENTS

| | | | |
|---|---|---|---|
| 6,850,671 | B2 | 2/2005 | Carnevale et al. |
| 6,990,265 | B2 * | 1/2006 | Kubby ............... G02B 6/12021 385/16 |
| 8,270,784 | B2 | 9/2012 | Thomson et al. |
| 8,699,838 | B2 | 4/2014 | Andrzejewski et al. |
| 9,029,242 | B2 | 5/2015 | Holden et al. |
| 9,223,094 | B2 | 12/2015 | Schneider et al. |
| 9,348,096 | B2 | 5/2016 | Parsons et al. |
| 9,442,259 | B2 * | 9/2016 | Furuya ................. G02B 6/4231 |
| 10,459,160 | B2 | 10/2019 | Brusberg |
| 10,684,419 | B2 | 6/2020 | Fortusini et al. |
| 2004/0240812 | A1 | 12/2004 | Sun et al. |
| 2004/0258359 | A1 | 12/2004 | Corkum et al. |
| 2013/0094801 | A1 | 4/2013 | Morris |
| 2014/0294339 | A1 | 10/2014 | Lagziel et al. |
| 2015/0166396 | A1 | 6/2015 | Marjanovic et al. |
| 2015/0261261 | A1 | 9/2015 | Bhagavatula et al. |
| 2016/0025942 | A1 | 1/2016 | Coffey et al. |
| 2016/0199944 | A1 | 7/2016 | Hosseini |
| 2017/0059781 | A1 | 3/2017 | Fortusini et al. |
| 2017/0146751 | A1 | 5/2017 | Sutherland |
| 2020/0241220 | A1 | 7/2020 | Evans |

FOREIGN PATENT DOCUMENTS

| | | | |
|---|---|---|---|
| CN | 102958642 | A | 3/2013 |
| CN | 102971838 | A | 3/2013 |
| CN | 103018799 | A | 4/2013 |
| CN | 105246850 | A | 1/2016 |
| CN | 105618936 | A | 6/2016 |
| EP | 1162484 | A2 * | 12/2001 ........... G02B 6/3538 |
| EP | 3077150 | A1 | 10/2016 |
| JP | 04284406 | A * | 10/1992 |
| JP | 09-311237 | A | 12/1997 |
| JP | 2002-267852 | A | 9/2002 |
| WO | 2009/001969 | A2 | 12/2008 |
| WO | WO-2012023430 | A1 * | 2/2012 ........... G02B 6/4231 |
| WO | 2014/165175 | A1 | 10/2014 |
| WO | 2015/081436 | A1 | 6/2015 |
| WO | 2016/137488 | A1 | 9/2016 |
| WO | 2017/046190 | A2 | 3/2017 |

OTHER PUBLICATIONS

Corbari et al., "Femtosecond versus picosecond laser machining of nano-gratings and micro-channels in silica glass", Optics Express, vol. 21, No. 4, 2013, pp. 3946-3958.

Fernández-Pradas et al., "Laser fabricated microchannels inside photostructurable glass-ceramic", Applied Surface Science, vol. 255, No. 10, 2009, pp. 5499-5502.

International Search Report and Written Opinion of the International Searching Authority; PCT/US2019/025294; dated Jun. 25, 2019; 12 Pages; European Patent Office.

International Search Report and Written Opinion of the International Searching Authority; PCT/US2019/025295; dated Jun. 26, 2019; 12 Pages; European Patent Office.

Karimelahi et al., "Rapid micromachining of high aspect ratio holes in fused silica glass by high repetition rate picosecond laser", Applied Physics A: Materials Science and Processing, vol. 114, 2013, pp. 91-111.

Optoscribe, "Fiber Coupled InterconneX (FCX™) For Photonic Integration", available online at <https://web.archive.org/web/20170509155220/http://www.optoscribe.com:80/products/fcx-fiber-coupled-interconnex/>, May 9, 2017, 2 pages.

* cited by examiner

WAVEGUIDE SUBSTRATES AND WAVEGUIDE SUBSTRATE ASSEMBLIES HAVING WAVEGUIDE ROUTING SCHEMES AND METHODS FOR FABRICATING THE SAME

CROSS-REFERENCE TO RELATED APPLICATIONS

This application is a continuation of International Application No. PCT/US19/25295, filed on Apr. 2, 2019, which claims the benefit of priority to U.S. Application No. 62/652,264, filed on Apr. 3, 2018, both applications being incorporated herein by reference.

BACKGROUND

Field

The present disclosure generally relates to optical connections and, more particularly, waveguide substrates, waveguide substrate connector assemblies, and methods of fabricating waveguide substrates for providing optical connections between optical fibers of optical connectors using various waveguide routing schemes.

Technical Background

In optical communication networks, optical fibers may be routed from a junction point toward a plurality of individual subscribers, such as residences, businesses and the like for directing the optical signals to the desired location. Thus, an enclosure such as a module may be used to receive and house a plurality of optical fibers, and then provide a breakout of optical connections for routing individual or pairs of optical fibers toward different locations in the optical network such as toward individual subscribers or the like. As an example, a multi-fiber connector may be provided as an input to an enclosure, and a plurality of output optical connectors may also be provided at the output of the enclosure for breaking out the optical signals of the multi-fiber connector into the desired optical paths. The connectors disposed at the edges of the enclosures or module also allow the network operator the flexibility to make moves, adds or changes to the optical network as needed at a convenient access location in the optical network. The output optical connectors of the enclosure have fiber optic cables attached to the connectors of the enclosure so that the optical signals may be routed toward the desired locations in the optical network. Optical paths within the enclosure break-out and route the optical signals from the multi-fiber connector to the output connectors for providing optical signals to and from desired locations. Typically, the optical signals are routed within the enclosure by optical fibers, and adapters at opposite sides of the enclosure provide an interface for the connectors external to the enclosure. However, the management and organization of many optical fibers within the enclosure may be challenging and occupy limited space in an equipment room or data center. Further, the enclosures or modules are organized and housed in equipment racks that are also large and bulky.

SUMMARY

The waveguide substrate concepts disclosed herein may be used with any suitable waveguide routing scheme. In one embodiment, a waveguide substrate includes a first surface and a second surface, and a plurality of waveguides within the waveguide substrate. The plurality of waveguides defines a plurality of inputs at the first surface (e.g., an input channel). All or a subset of the plurality of waveguides may extend to the second surface to at least partially define a plurality of outputs (e.g., an output channel) at the second surface.

Although the terms "input" and "output" are used the optical signals may be bidirectional and travel in each direction of the waveguide or not depending on the network architecture. Generally speaking, the "input" is considered the upstream end of the network closer to the switching equipment or the like and the "output" is considered the downstream end of the network closer to the end user.

The waveguide routing scheme between the inputs at the first surface and one or more outputs at the second surface of the waveguide substrate may have any suitable scheme such as a shuffle of waveguides, an arrangement of receive-transmit waveguides that form duplex pairs (e.g., receive-transmit pairs) of waveguides, receive-transmit groupings for parallel transmission, or indexing (e.g., shifting of inputs to outputs in the array) of waveguides as desired. In one embodiment, the waveguides may be arranged in pairs at the outputs using adjacent pairing of waveguides from the inputs at the first surface or some of the pairs are non-adjacent pairings of waveguides from the inputs at the first surface as desired. Other embodiments using the present concepts may add or drop waveguides to a third surface of the waveguide substrate.

One aspect of the disclosure is directed to a waveguide substrate comprising a first surface and a second surface, a plurality of waveguides within the waveguide substrate, and at least one alignment feature. The plurality of waveguides defining a plurality of inputs at the first surface and extend to the second surface to define a plurality of outputs at the second surface. The plurality of outputs at the second surface are arranged in output pairs. The at least one alignment feature is used for aligning a connector with the inputs or outputs. In other embodiments, each output pair cooperates with a first output alignment feature and a second output alignment feature. The plurality of inputs may have one or more cooperating output alignment features for aligning a connector as well.

In another aspect of the disclosure, at least some of the plurality of waveguides change position within the waveguide substrate. The change in position may be a fanning-out of the spacing between outputs compared with the spacing of inputs for breaking-out the optical channels for mating. In another embodiment, the plurality of waveguides change position so that some of the plurality of waveguides are no longer adjacent to same waveguides at the second surface compared with the adjacent waveguides at the first surface. The waveguide substrate comprises a spaced-apart zone where the waveguides change elevations in waveguide substrate so that paths of the waveguides may change positions (e.g., cross over other waveguides) within the waveguide substrate between the input at the first surface and the output at the second surface.

In another aspect, a waveguide substrate comprises a first surface and a second surface, and a plurality of waveguides within the waveguide substrate. The plurality of waveguides defines a plurality of inputs at the first surface. A subset of the plurality of waveguides extends to the second surface to at least partially define a plurality of outputs at the second surface. At least one branching waveguide extends between one of the first surface and the second surface to a surface other than the first surface and the second surface. The waveguide substrate includes a first input alignment feature and a second input alignment feature within the first surface, wherein the plurality of inputs is disposed between the first input alignment feature and the second input alignment feature, and a first output alignment feature and a second output alignment feature within the second surface, wherein the plurality of outputs is disposed between the first output alignment feature and the second output alignment feature.

In another embodiment, a waveguide substrate assembly includes a first waveguide substrate, a second waveguide substrate, and at least two alignment pins. Each of the first waveguide substrate and the second waveguide substrate includes a first surface and a second surface opposite the first surface, and a plurality of waveguides. The plurality of waveguides defines a plurality of inputs at the first surface. A subset of the plurality of waveguides extends to the second surface to at least partially define a plurality of outputs at the second surface. At least one branching waveguide extends between one of the first surface and the second surface to a surface other than the first surface and the second surface. Each of the first waveguide substrate and the second waveguide substrate includes a first input alignment feature and a second input alignment feature within the first surface, wherein the plurality of inputs is disposed between the first input alignment feature and the second input alignment feature, and a first output alignment feature and a second output alignment feature within the second surface, wherein the plurality of outputs is disposed between the first output alignment feature and the second output alignment feature. The second surface of the first waveguide substrate is coupled to the first surface of the second waveguide substrate. The at least two alignment pins are disposed within the first output alignment feature and the second output alignment feature of the first waveguide substrate and the first input alignment feature and the second input alignment feature of the second waveguide substrate.

In yet another embodiment, a method of fabricating a waveguide substrate includes applying a laser beam to the waveguide substrate to modify a material of the waveguide substrate at one or more damage regions corresponding with a predetermined location of at least one alignment feature, and applying the laser beam to the waveguide substrate to form at least one waveguide extending from a first surface of the waveguide substrate to a second surface of the waveguide substrate, wherein one or more portions of the damage region are used as reference fiducials while applying the laser beam to form the at least one waveguide. The method further includes applying an etching solution to remove the one or more damage regions to form the at least one alignment feature.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Figure 1A:
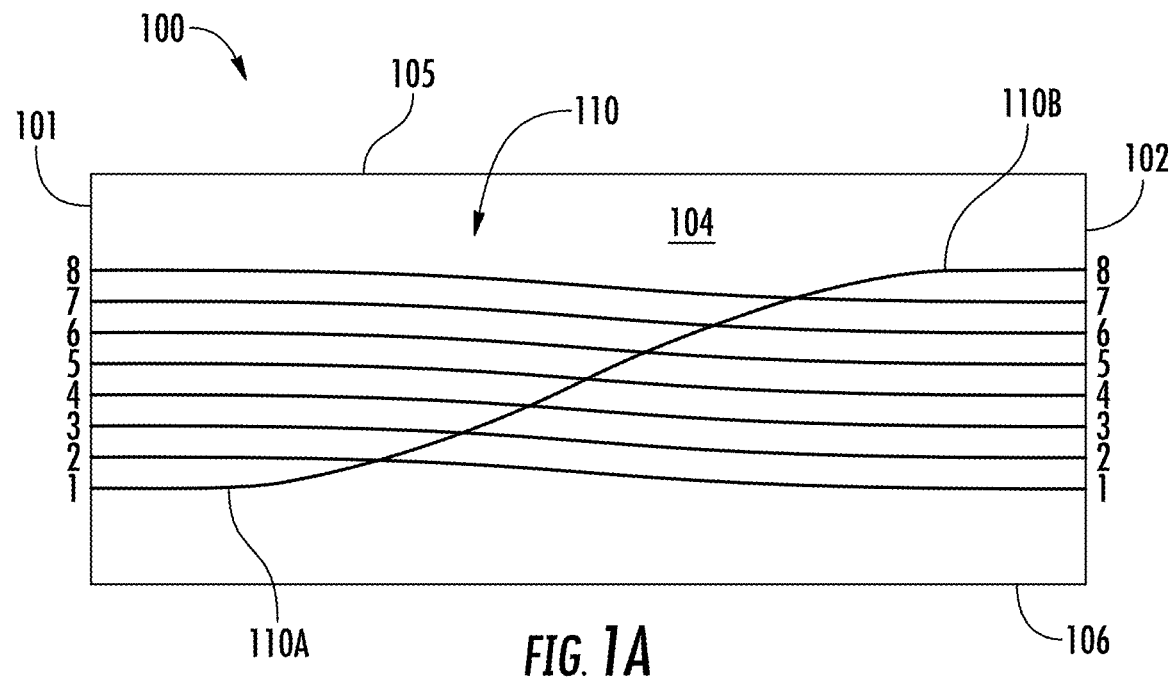
FIG. 1A schematically depicts a top view of an example waveguide substrate having a waveguide routing scheme arranged as an add-waveguide and a drop waveguide according to one or more embodiments described and illustrated herein.

Embodiments described herein are directed to waveguide substrates and waveguide substrate connector assemblies that route optical signals by one or more waveguides within the waveguide substrate. Optical communication networks are used to provide data to a plurality of subscribers. Optical fibers are thus routed toward individual subscribers, such as businesses, residences, and the like. In some cases, optical fibers of a multi-fiber optical cable are broken out into smaller subsets of one or more optical channels for routing toward the desired location in the optical network. Thus, means for routing optical signals of a multi-fiber optical connector between different, individual locations (e.g., individual subscribers) are desired. For example, individual optical fibers optically coupled to one or more multi-fiber optical connectors may be routed within a communication enclosure, and then routed to individual destinations from the enclosure. However, fiber-management of the many optical fibers within the enclosure may become unwieldy, and may require a large enclosure.

The concepts of waveguide substrates disclosed herein may be used with any suitable waveguide routing scheme. The concepts of waveguide substrates may be used as a replacement for the large and bulky modules or enclosures that physically route optical fibers within a box. The concepts disclosed are advantageous since they can take less space than conventional modules or enclosures, thereby improving density. Additionally, the waveguide substrates allow adaptability for moves, adds and changes to the optical network.

Waveguide substrates described herein have an integrated waveguide layout that uses two or more sides of a glass (or other suitable material) for a desired waveguide routing scheme. In one explanatory waveguide routing scheme the waveguide substrate may add or drop waveguide channels, and shift the pass-through waveguides in an "indexed" fashion to enable multiple waveguide substrates to be concatenated. The pass-through waveguides may enter and exit on different sides such as opposite ends of the waveguide substrate and are laterally shifted in position from the input end to the output end by the number of waveguides that terminate at different faces within the waveguide substrate. In another explanatory waveguide routing scheme, the waveguide substrate has the optical waveguides arranged in pairs for separate receive-transmit channels. These pairs of optical waveguides may have any suitable arrangement such as pairing adjacent optical waveguides and/or pairing non-adjacent optical waveguide pairs.

These waveguides may be created with a laser writing process or by any other waveguide fabrication process. In embodiments with waveguide routing schemes where the waveguides of the waveguide substrate change positions or cross-over the waveguides can have a spaced-apart zone SZ such as shown in FIG. 1H so that the waveguides have proper spacing from other waveguides to avoid cross-talk and the like. The spaced-apart zone SZ may occur in any suitable direction and the waveguides may return to a common plane at the outputs for ease of connection. In other words, the outputs of the waveguides may be aligned in a common plane after changing positions so that any output alignment features may be located on a common plane as well, but other variations are possible if desired. Additionally, the waveguide substrates can have the inputs or outputs disposed on any suitable side. By way of example, drop or add waveguides may terminate on the adjacent surfaces, preferably near the middle of the surface to allow for external fiber optic connectors to be attached. Given their three-dimensional nature, these waveguides are created with the laser writing process.

Different waveguide routing schemes will be disclosed for the concepts of forming waveguides in the waveguide substrates. Concepts for the alignment features of inputs and outputs may be used with any of the different waveguide routing schemes as desired and will be disclosed with an explanatory waveguide routing scheme for the sake of brevity.

In a first waveguide routing scheme, a first fiber may be routed to a splitter for servicing local customers and the remaining fibers are "indexed" or moved up as they exit the terminal to connect to the next terminal. Indexing provides that the second fiber entering the terminal will exist as the first fiber to enter the next terminal, and so on in a daisy-chaining of the indexing terminals. This waveguide routing scheme may be used with the concepts of waveguide substrates disclosed herein.

In a "drop" waveguide routing scheme, the waveguide substrate has M optical inputs on one of the waveguide substrate surfaces, M-N optical outputs on another surface, and N waveguide drops terminate in the center of any of the surfaces of the waveguide substrate where N=1 to M. In one embodiment, N=1 and M is 8 or 12. That waveguide drops may terminate at locations other than the center of the surfaces of the waveguide substrate.

In "add/drop" embodiments, there are M inputs on one of the waveguide substrate surfaces, Q outputs on another surface and N additional outputs and P additional inputs on any of the 4 other surfaces of the six-sided waveguide substrate where the number of inputs equals the number of outputs, M+P=Q+N. In one non-limiting example, N and P are numbers between 1 and 4. The N and P waveguides may have smoothly varying paths to sides orthogonal to the M inputs and Q outputs and enter or exit the waveguide substrate surface at an angle. These waveguides need to avoid bends smaller than a minimum-defined radius where the optical loss increases significantly. In some embodiments, the M inputs and Q outputs are on opposite sides of the waveguide substrate and in the same plane forming a linear array of waveguides of the same pitch or spacing. It should be understood that waveguides may begin and terminate at the same surface of the waveguide substrate.

Another waveguide routing scheme is a break-out of waveguides from larger groupings such as 8, 12, 24, 36, 48 etc. waveguides at the input to smaller subsets such as 2, 4, 8, 12, etc. at the outputs for receive-transmit architectures. By way of explanation, there may be 12 inputs for a waveguide substrate that are grouped into 6-pairs of two outputs for duplex receive-transmit architectures; however, other pairings of receive-transmit input or outputs are possible such a 4-receive outputs and 4-transmit outputs broken-out from 8-inputs for parallel transmission architectures. The pairs of outputs may use adjacent waveguides for pairing (e.g., 1-2 pair, 3-4 pair, 5-6 pair, 7-8 pair, 9-10 pair, 11-12 pair) or the pairs of output may use some non-adjacent waveguides for pairing (e.g., 1-12 pair, 2-11 pair, 3-10 pair, 4-9 pair, 5-8 pair, 6-7 pair). If waveguides in the waveguide substrate are required to change position or cross-over other waveguides, then the waveguides may have a spaced-apart zone SZ for allowing the changing of waveguide positions without adverse cross-talk among waveguides.

The waveguides within the waveguide substrates described herein may be fabricated by a laser-writing process wherein a short-pulsed laser is used to create three dimensional waveguides within the material of the waveguide substrate (e.g., glass material). A short pulse (sub-picosecond) laser tightly focused into waveguide substrate changes the material structure and raises the refractive index. By controlling the laser position (e.g., via translation stages), these waveguides can be created anywhere with the waveguide substrate. Further, by controlling the laser power and scan speed, single mode waveguides of low optical loss are possible. The waveguides may extend from one edge of the waveguide substrate to another.

However, waveguides at the end of the waveguide substrate may necessitate effective interconnects to transfer a signal in a waveguide into an optical fiber where it may be routed to a new destination. Embodiments of the present disclosure provide component parts and integral features for optically connecting waveguides to optical fibers within input and output optical connectors. One or more engagement and/or alignment features are provided on edges and/or surfaces of the waveguide substrate that mate with corresponding engagement and/or alignment features of one or more optical connectors.

Alignment features on the glass sheet may include coarse alignment features and fine alignment features, both cooperating to allow a passive alignment of, for example, an LC connector and an MT connector to an edge of the waveguide substrate. Such coarse alignment features may include, but are not limited to, cuts in the shape of a "V" that extend from a top surface to a bottom surface of the waveguide, effectively "notching" the edge of the waveguide substrate. Corresponding features on a connector housing engage the coarse alignment features to bring engagement paths for a fiber optic connector to within axial proximity of the waveguides of the waveguide substrate. Pin bores and other features may also be fabricated on the edges of the waveguide substrate. "Float," or rather built-in freedom of movement, allows for fine alignment as in the manner of mating two optical connectors, e.g., guide pins and split sleeves.

These alignment and/or engagement features may be fabricated into the waveguide substrates described herein by a laser-damage-and-etch process. When the laser power is increased, the material (e.g., glass) of the waveguide substrate becomes damaged such that subsequent exposure to chemical etchant causes a high selective spatial variation in etching in the regions exposed to the laser. Because the etch rate of the material is higher at the regions damaged by the laser than regions not damaged by the laser, this process may be used to create alignment and/or engagement features for attaching fibers.

In some embodiments, the laser source used to fabricate the waveguides of the waveguide substrate is the same laser source that is used to fabricate the alignment and/or engagement features by the laser-damage-and-etch process. This allows for precise alignment between the ends of the waveguides at the edges of the waveguide substrate and the alignment and/or engagement features. For example, the waveguides may be first written into the waveguide substrate. These waveguides may be used as one or more reference fiducials in damaging the material of the waveguide substrate to fabricate the alignment and/or engagement features at predetermined locations. Alternatively, the waveguide substrate may first be laser-damaged to form the alignment and/or engagement features, and the waveguides may be laser-written using one or more of the alignment and/or engagement features as one or more alignment fiducials. The precise alignment between the waveguides and the alignment and/or engagement features of the waveguide substrate provide for precise alignment between the waveguides and the optical fibers of the optical connectors optically coupled to the waveguide substrate.

Figure 1B:
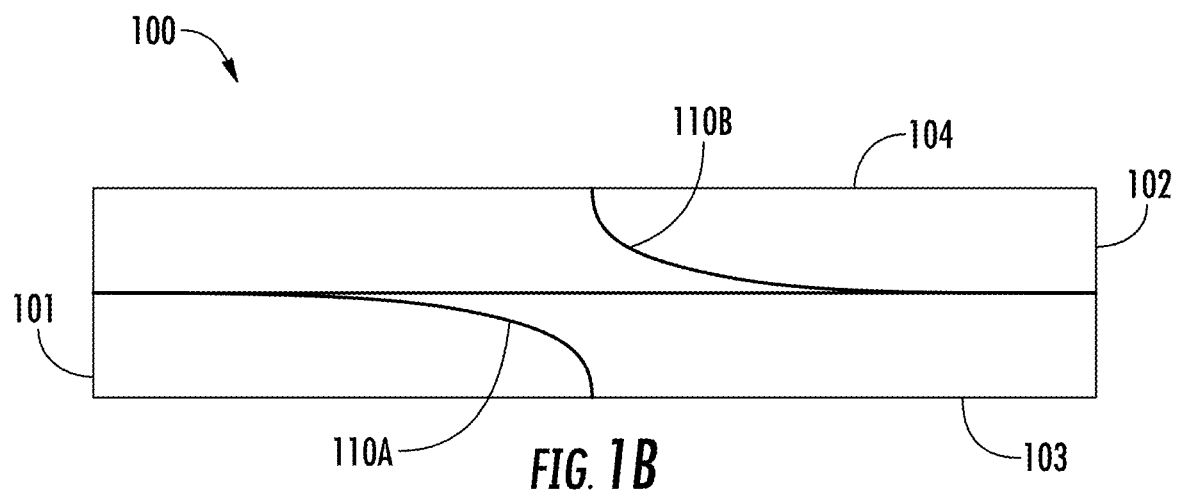
FIG. 1B schematically depicts a side elevation view of the example waveguide substrate depicted in FIG. 1A.
Figure 1C:
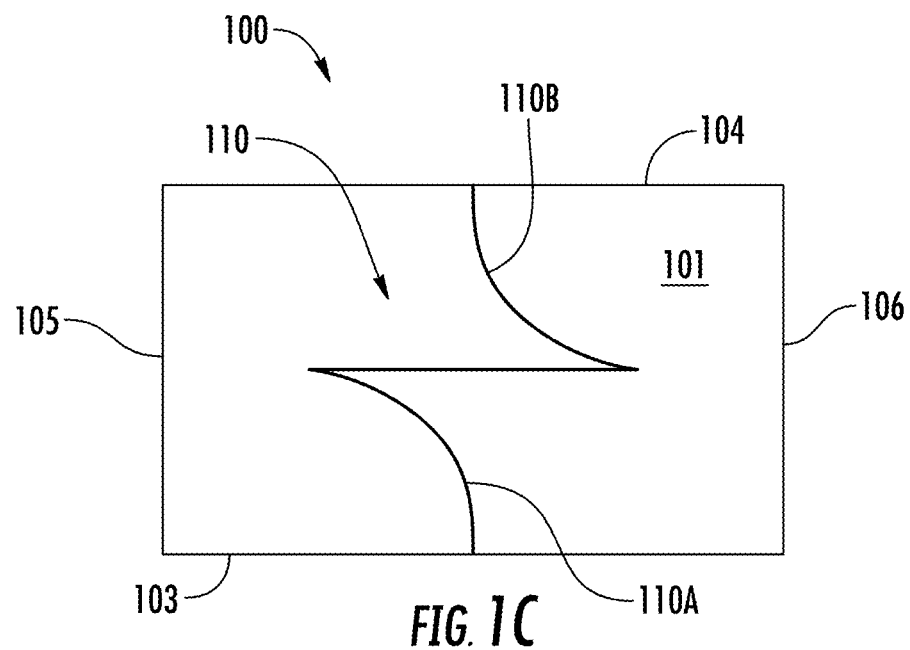
FIG. 1C schematically depicts a front elevation view of the example waveguide substrate depicted in FIG. 1A.
Figure 1D:
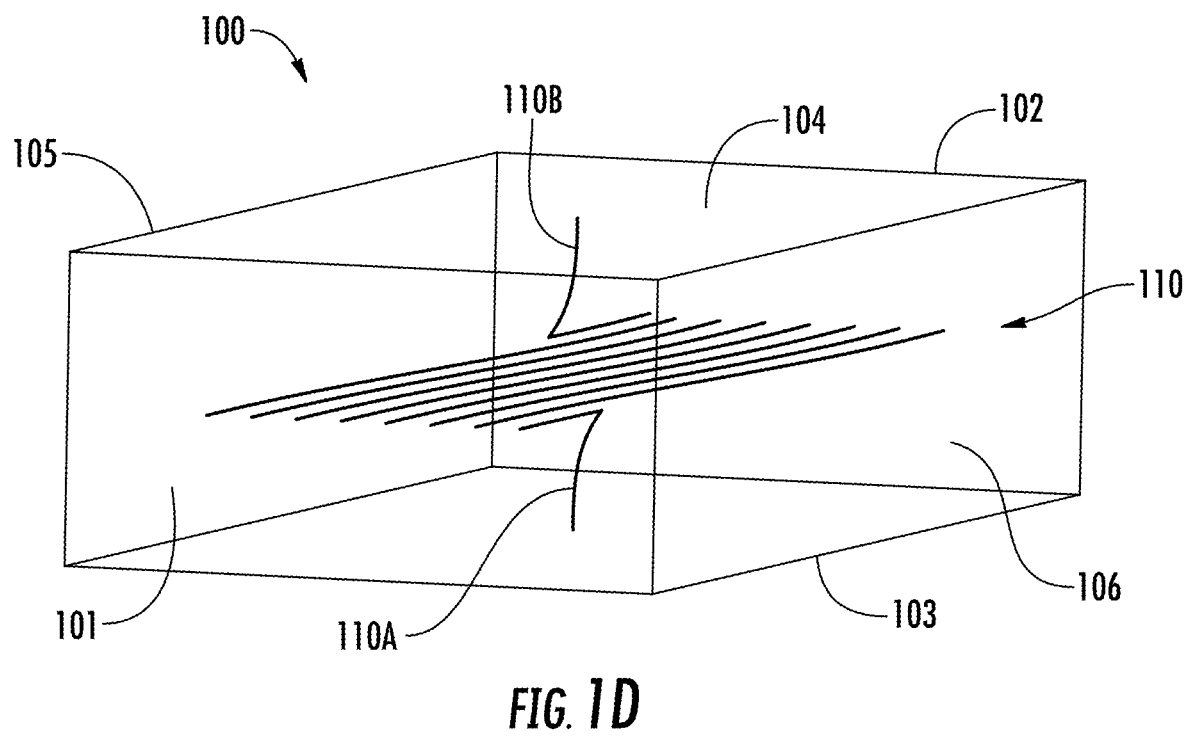
FIG. 1D schematically depicts a front perspective view of the example waveguide substrate depicted in FIG. 1A.
Figure 1E:
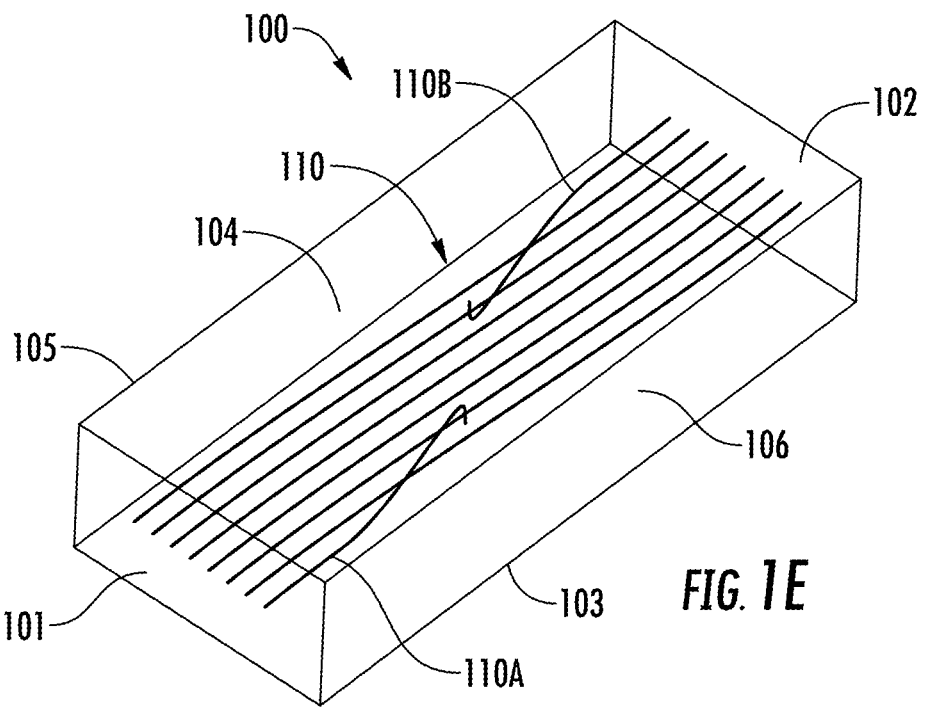
FIG. 1E schematically depicts a top perspective view of the example waveguide substrate depicted in FIG. 1A.
Figure 1F:
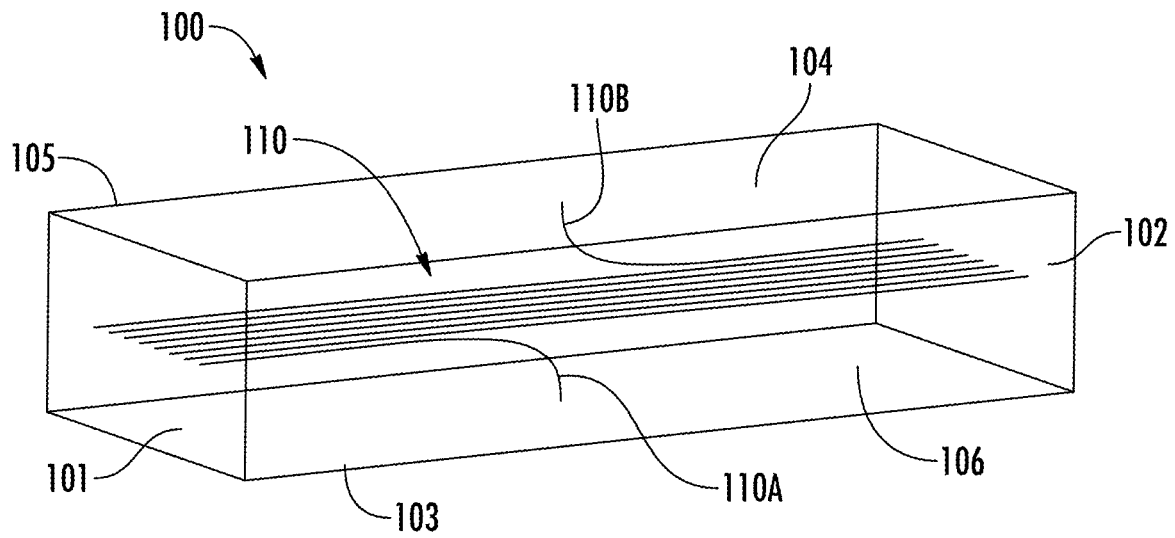
FIG. 1F schematically depicts a side perspective view of the example waveguide substrate depicted in FIG. 1A.
Figure 1G:
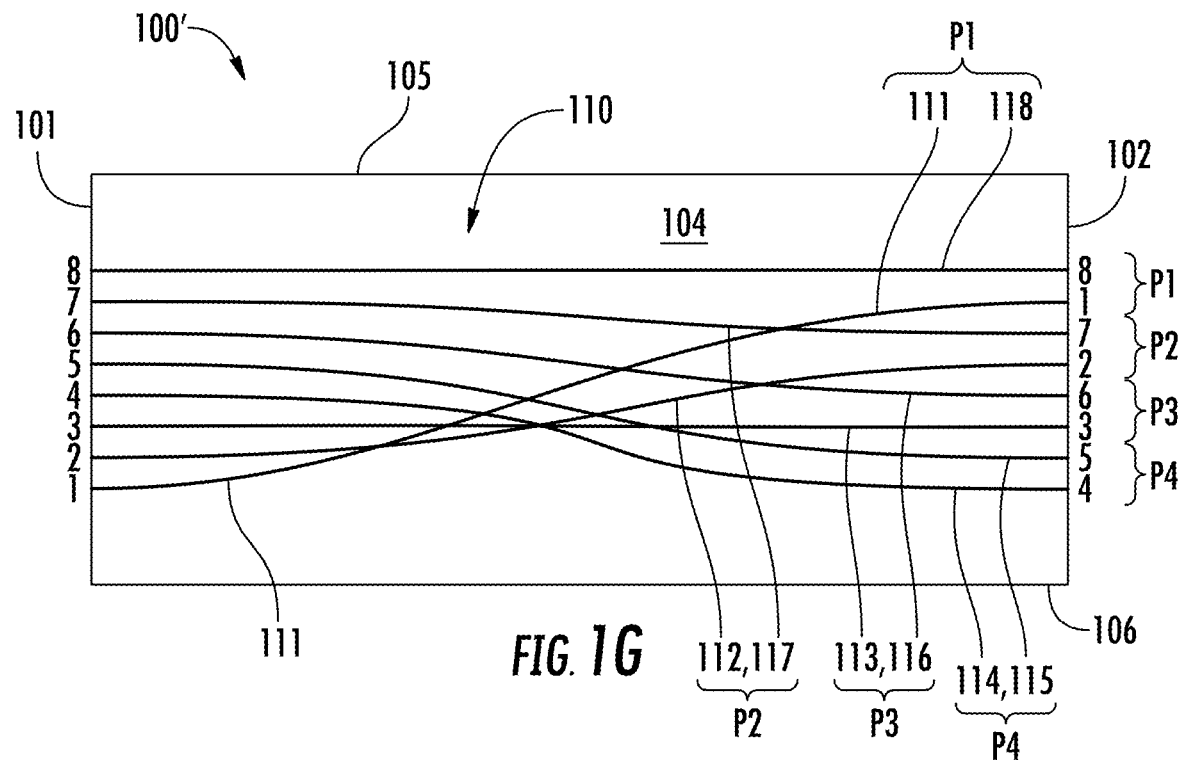
FIG. 1G schematically depicts a top view of another example waveguide substrate having a waveguide routing scheme arranged with receive-transmit duplex pairs according to one or more embodiments described and illustrated herein.
Figure 1H:
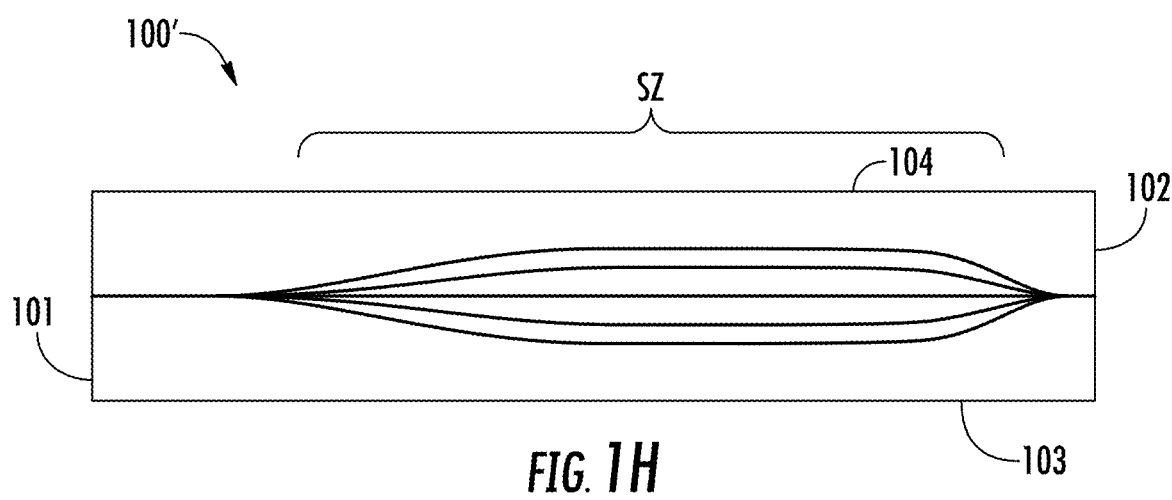
FIG. 1H schematically depicts a side elevation view of the example waveguide substrate depicted in FIG. 1G showing the spaced zone where the waveguides are separated for inhibiting cross-talk.

FIGS. 1A-1F disclose a non-limiting example of a waveguide substrate 100 including a plurality of waveguides 110 is schematically depicted. FIGS. 1G and 1H disclose another non-limiting example of waveguide substrate 100' including a plurality of waveguides 110 that change positions and have a spaced-apart zone as schematically depicted. Particularly, FIGS. 1A-1F shows a specific example where M=Q=8 and N=P=1. FIG. 1A is a top view of the waveguide substrate 100, FIG. 1B is a side elevation view of the waveguide substrate 100, FIG. 1C is a front elevation view of the waveguide substrate 100, and FIG. 1D-1F are various perspective views of the waveguide substrate 100. The waveguide substrate 100 may be fabricated from any suitable material, such as glass, sapphire and semiconductor materials such as silicon. The waveguide substrate 100 has a first surface 101 (e.g., an input edge), a second surface 102, (e.g., an output edge), a third surface 103, a fourth surface 104, a fifth surface 105, and a sixth surface 106.

The example waveguide substrate 100 has eight waveguides 110, although any number of waveguides may be provided in one or multi-dimensional arrays. Each waveguide 110 is defined by a line on or within the waveguide substrate 100 having a refractive index that is different from the material outside of the waveguide 110 such that light is maintained within the waveguide 110 when propagating through the waveguide substrate 100. Any known or yet-to-be-developed methods of fabricating waveguides 110 into the waveguide substrate may be utilized. For example, an ion-exchange process may be used to write the plurality of waveguides 110 by using a mask to change the refractive index of the material along lines defining the desired plurality of waveguides. As another example, a pulsed laser may be applied to apply two-dimensional or three-dimensional waveguides within a bulk of the waveguide substrate 100.

In the illustrated example, the waveguides 110 extend from the first surface 101 to an opposite second surface 102. Thus, the first surface 101 is referred to herein as an input edge or an input surface, and the second surface 102 is referred to herein as an output edge or an output surface. The terms input and output do not imply any direction of optical signals and are used herein for illustrative purposes only. As shown in FIG. 1A, the eight waveguides 110 provide eight inputs at positions 1-8 on the first surface 101, and eight outputs at positions 1-8 on the second surface 102. The individual waveguides 110 are indexed in the sense that the waveguide having an input at position 1 at the first surface 101 is provided to an output at position 2 at the second surface 102, an input at position 2 at the first surface 101 is provided to an output at position 3, and so on.

Referring generally to FIGS. 1A-1F, drop-waveguide 110A has an input at position 8 (i.e., a first outer position) at the first surface but does not extend to the second surface 102. Rather, drop-waveguide 110A extends downward such that its output is present at the third surface 103. Thus, drop-waveguide 110A does not extend to the output edge provided by the second surface 102 so it is therefore dropped from the subset of waveguides 110 that reach the output positions at the second surface 102. Particularly, drop-waveguide 110A extends toward a central location of the waveguide and then down to the third surface 103 in three-dimensional space. The drop-waveguide 110A may extend to surfaces other than the third surface 103. As an example, and not a limitation, the drop-waveguide 110A may be provided to a subscriber of an optical communications network. As a further non-limiting example, the drop-waveguide 110A may be provided to an optical splitter such that optical signals propagating within the drop-waveguide 110A may be split into multiple optical fibers and provided to multiple subscribers.

The example waveguide substrate 100 further includes an add-waveguide 110B that extends from a central region of the fourth surface 104 to output position 1 (i.e., a second outer position) at the second surface 102. Thus, the add-waveguide 110B is added to the outputs at the second surface 102 to take the place of the waveguide extending from input position 1 that is indexed to output position 2. The add-waveguide 110B may be another optical channel within the optical communications network that is desired to be added to the pass-through waveguides 110 of the waveguide substrate 100.

Because the add-waveguide 110B and the drop-waveguide 110A do not reach the opposite surface, they are branching waveguides within the waveguide substrate 100.

As shown in FIGS. 1A-1F, the add-waveguide 110B and the drop-waveguide 110A are centrally disposed on the fourth surface 104 and sixth surface 106, respectively, such that they are vertically aligned with one another. However, embodiments are not limited thereto. The add-waveguide 110B and the drop-waveguide 110B may be positioned on a respective surface such that there is enough area to add a connector as described in more detail below, and at a location that prevents a small bend radius for the add-waveguide 110B and the drop-waveguide 110D such that optical losses occur.

The example waveguide substrate 100' schematically shown in FIGS. 1G and 1H is similar to the waveguide substrate 100, but the outputs are arranged as pairs P1, P2, P3 and P4 as shown. The pairs P1-P4 could be pairing of adjacent waveguides 110 or pairing of non-adjacent waveguides 110. In this embodiment, the waveguides 110 of waveguide substrate 100' are shown as pairings of some non-adjacent pairs that have a spaced-apart zone SZ as schematically depicted in FIG. 1H. The spaced-apart zone SZ of the waveguides 110 avoids cross-talk among the waveguides. Once the change of position occurs the waveguides 110 may be routed to a common plane at the output at the second surface 102 or not. Although, waveguide substrate 100' depicts eight waveguides 110, any suitable number of waveguides may be provided in one or multi-dimensional arrays.

Waveguides 110 of waveguide substrate 100' are further designated by waveguide position 111-118 corresponding to the input positions 1-8 as labelled on the left-side of FIG. 1G. As depicted, the waveguides 110 are arranged in pairs P1-P4 of two waveguides, but any suitable number of inputs or pairs is possible using the concepts disclosed. Waveguides 110 of waveguide substrate 100' change position from the input the first surface 101 to the output at the second surface 102. The pairs P1-P4 at output some non-adjacent waveguides 110 for a transmit-receive architecture. Specifically, the farthest outboard waveguides 111-118 at the input are paired together to form pair P1 at the output, then working inboard the next farthest outboard waveguides 112-117 at the input are paired together to form pair P2 at the output, continuing inward the next farthest outboard waveguides 113-116 at the input are paired together to form pair P3 at the output, and then the middle waveguides 114-115 at the input are paired together to form pair P4 at the output. Consequently, the 8 waveguides at the input of the first surface 101 suitable for an MT connection are formed as 4-pairs at the output at the second surface 102 suitable for a simplex or duplex connection for pairing (e.g., positions 1-8 pair, 2-7 pair, 3-6 pair, 4-5 pair).

In some embodiments, alignment features may be provided within the material of the waveguide substrate to enable the coupling of optical connectors that optically couple optical fibers to the waveguides of the waveguide substrate. Additionally, alignment features may be provided to enable concatenation of multiple waveguide substrates together, as described in more detail below. The alignment features may be fabricated by a laser-damage-and-etch process, as described in detail below. In some embodiments, the laser process used to write the waveguides is the same laser process used to form the alignment features. This provides precise registration between the waveguides and the alignment features.

The alignment features may be provided in a variety of configurations. As non-limiting examples, the alignment features may be pin bores operable to receive one or more pins of an optical connector, such as pins of a mechanical transfer—(MT) type optical connector (e.g., MTP/MTO optical connectors). These alignment features show a specific example; however, they may be used or adapted for use with any of the waveguide routing schemes disclosed.

Figure 2A:
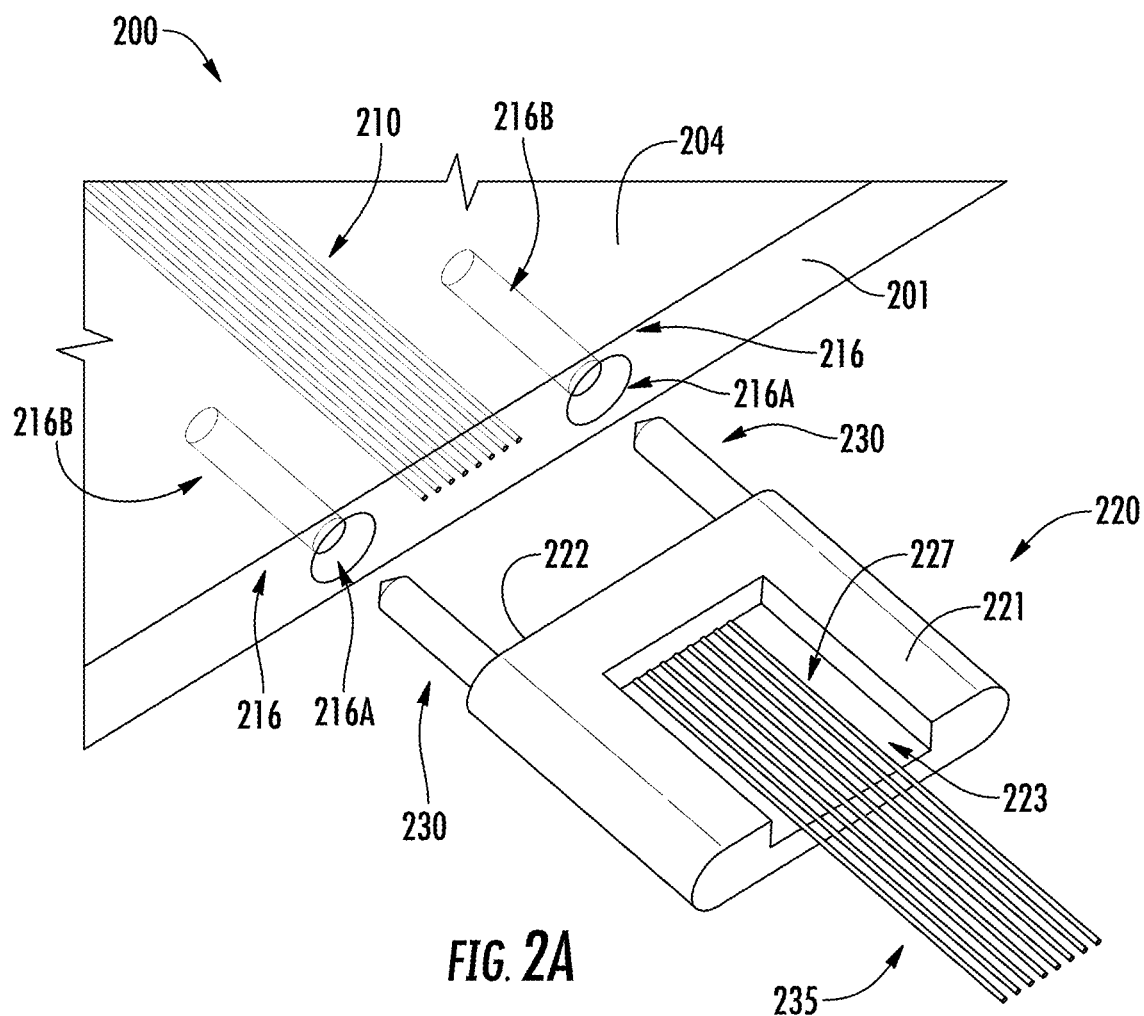
FIG. 2A schematically depicts a partial top perspective view of an example waveguide substrate having pin bores and an example optical connector according to one or more embodiments described and illustrated herein.
Figure 2B:
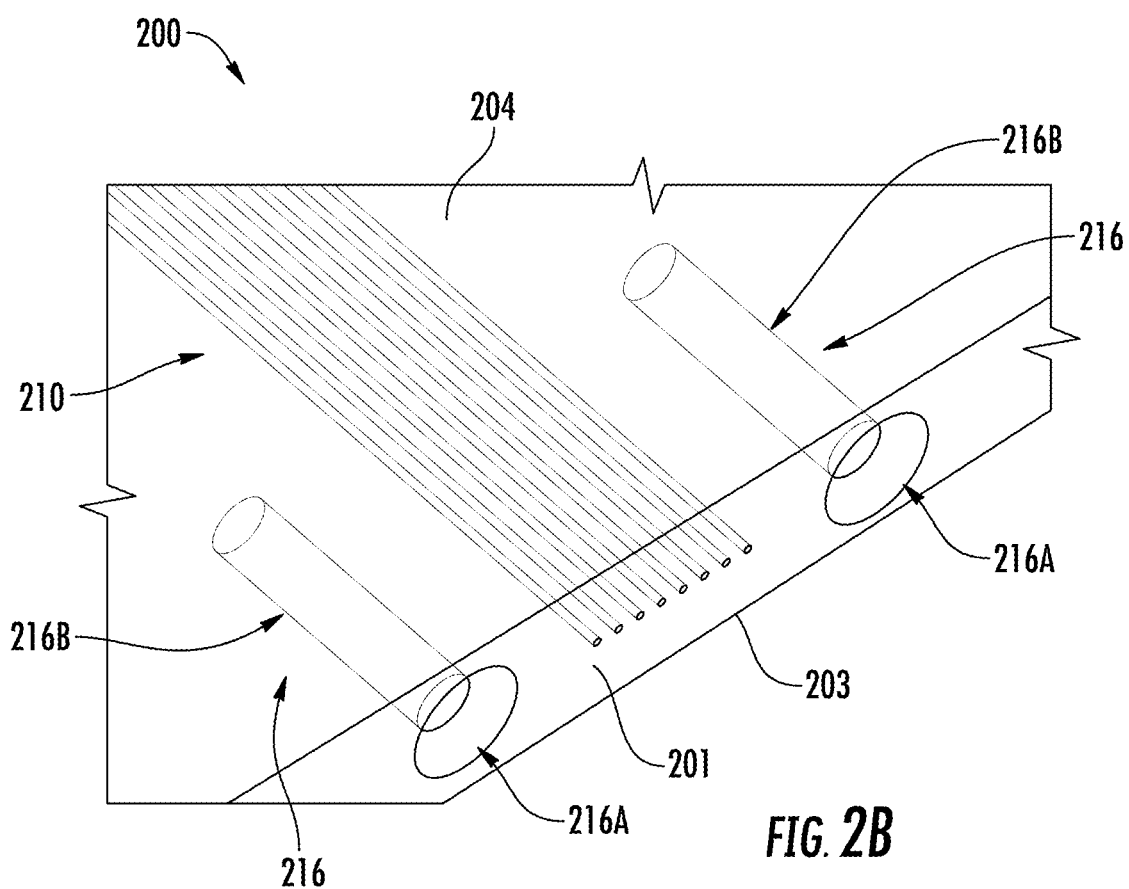
FIG. 2B schematically depicts a partial top perspective view of the example waveguide substrate depicted in FIG. 2A.
Figure 2C:
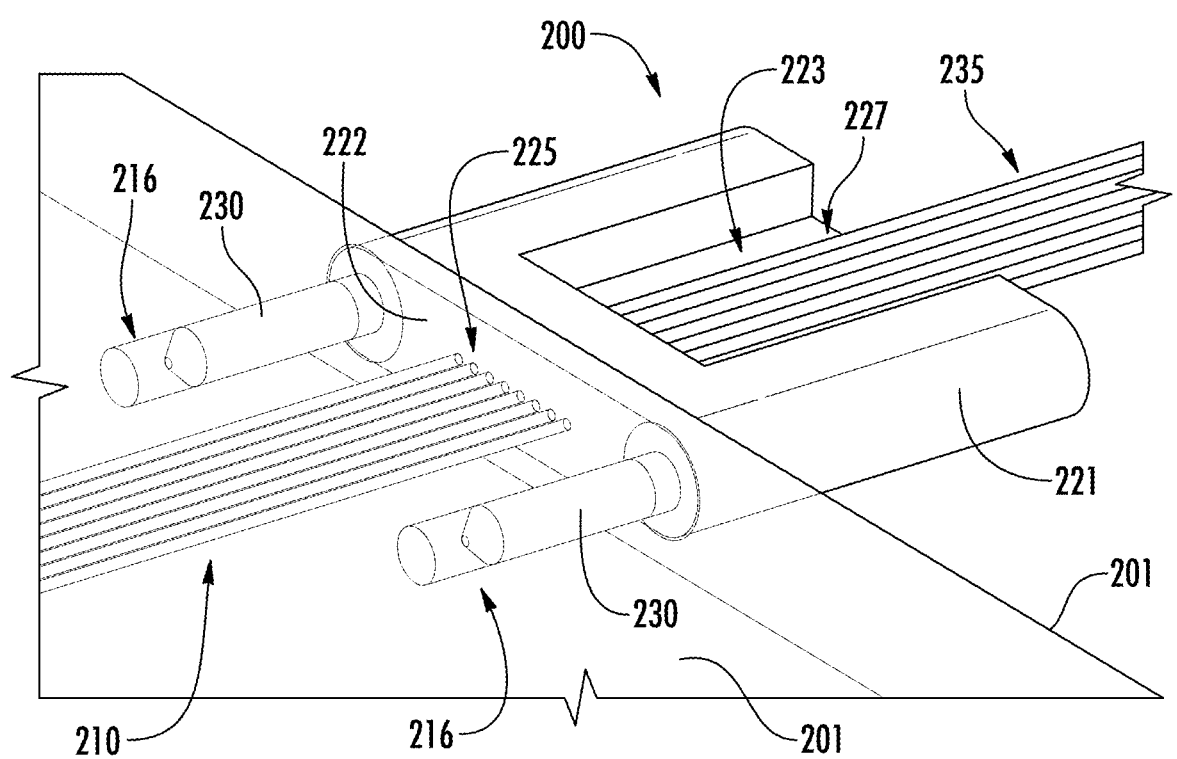
FIG. 2C schematically depicts a perspective view of the example optical connector coupled to the example waveguide substrate depicted in FIG. 2A according to one or more embodiments described and illustrated herein.

FIGS. 2A-2C schematically illustrate a partial view of an example waveguide substrate 200 and an example optical connector. Particularly, FIG. 2A illustrates the example waveguide substrate 200 and the example optical connector 220 in an unmated state, FIG. 2B shows a close-up perspective view of a first surface 201 of the waveguide substrate 200, and FIG. 2C shows the waveguide substrate 200 and the optical connector 220 in a mated state. The optical connector 220 depicted in FIGS. 2A-2C is for illustrative purposes only, and that other optical connector configurations are possible. The example optical connector 220 has a body 221 that receives a plurality of optical fibers 235 through bores 225 that terminate at an optical coupling surface 222. Accordingly, the end faces of the optical fibers 235 are present at the optical coupling surface 222. The example optical connector 220 further includes a recess 223 having grooves 227 into which the plurality of optical fibers 235 are disposed. In some embodiments, a cover (not shown) or other fiber securing device may be disposed within the recess 223 to maintain the plurality of optical fibers 235 within the grooves 227. As an example, and not a limitation, the cover may be secured within the recess 223 by an adhesive.

The example optical connector 220 further comprise two alignment pins 230 extending from the optical coupling surface 222 such that the bores 225 of the body 221 are disposed between the two alignment pins 230. The alignment pins 230 may be integrally formed (e.g., molded as a single component as the body 221) or as separate pins that are inserted into bores of the body 221. The dimensions of the alignment pins 230 are not limited by this disclosure. As an example, and not a limitation, the alignment pins 230 may be configured as MTO/MTP optical connector alignment pins.

Referring specifically to FIG. 2B, the example waveguide substrate 200 has two pin bores 216 extending into a first surface 201 and between a third surface 203 and a fourth surface 204. The example pin bores 216 comprise a main portion 216B and a tapered entrance portion 216A. The tapered entrance portion 216A has an inward taper such that the diameter of the pin bore 216 decreases in a direction that is into the bulk of the waveguide substrate 200 until it meets the main portion 216B. The tapered entrance portion 216A may ease the insertion of the two alignment pins 230 into the two pin bores 216. The inner diameter of the main portion 216B may closely match the outer diameter of the two alignment pins 230 such that the two alignment pins 230 securely mate with the main portion 216B of the two pin bores 216 by an interference fit. As an example, and not a limitation, the diameter of the alignment pins may be in the range of 300 μm to 700 μm, including endpoints.

FIG. 2C depicts the two alignment pins 230 of the optical connector 220 disposed within the main portion 216B of the two pin bores 216. When the optical connector 220 is mated with the first surface 201 of the waveguide substrate 200, the ends of the optical fibers 235 are aligned with the waveguides 210 such that the optical fibers 235 and the waveguides 210 are optically coupled with one another. Due to the registration of the waveguides 210 to the pin bores 216 as described in more detail below, the optical fibers 235 are precisely aligned with the inputs or outputs of the waveguides 210.

Figure 2D:
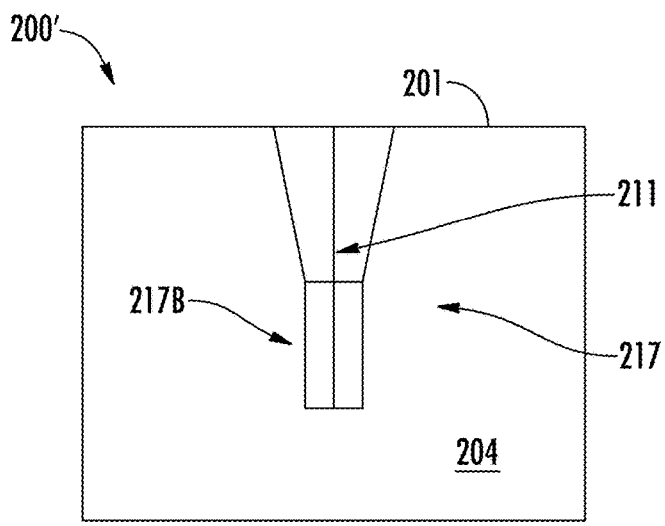
FIG. 2D schematically depicts a partial top view of an example waveguide substrate having grooves according to one or more embodiments described and illustrated herein.
Figure 2E:
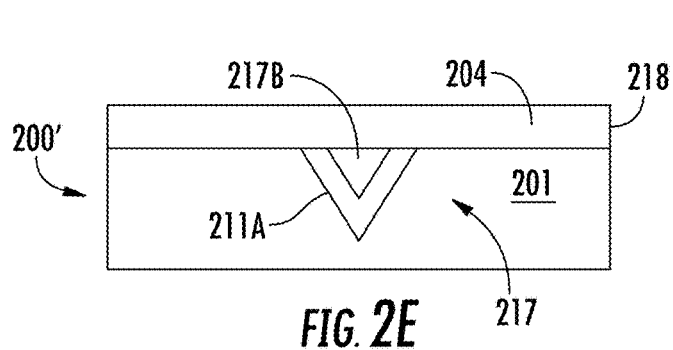
FIG. 2E schematically depicts a front perspective view of the example waveguide substrate depicted in FIG. 2D with an example cover according to one or more embodiments described and illustrated herein.
Figure 2F:
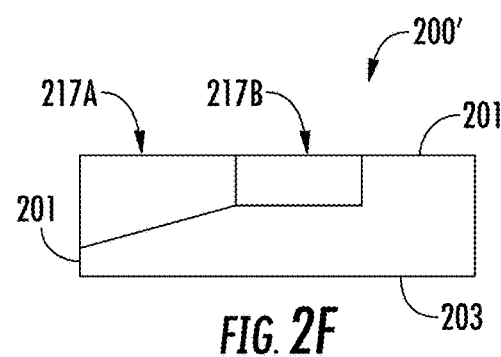
FIG. 2F schematically depicts a partial side elevation view of the example waveguide substrate depicted in FIG. 2D.

In some embodiments, the alignment features may be provided by grooves etched into one or more surfaces of the waveguide substrate. FIGS. 2D-2F schematically illustrate partial views of an example waveguide substrate 200' having an alignment feature configured as a groove 217 having a main portion 217B and a tapered entrance portion 217A. As shown in FIG. 2E, the groove 217 may be configured as a v-shaped groove. However, embodiments are not limited thereto. The tapered entrance portion 217A may have tapered surfaces that narrow the groove 217 until the tapered entrance portion 217A meets the main portion 217B. In some embodiments, a cover 218 is positioned over the groove 217 to form a cavity into which an alignment pin (e.g., alignment pin 230) of an optical connector is inserted. In the illustrated embodiment, the cover 218 is disposed on the fourth surface 204 of the waveguide substrate 200'. The tapered entrance portion 217A may provide for easier insertion of the alignment pin into the groove 217. Any number of alignment grooves may be provided within the waveguide substrate 200'. It should also be understood that the alignment features (e.g., grooves and/or pin bores and alignment pins) may be utilized to couple multiple waveguide substrates together, as described in more detail below.

Figure 2G:
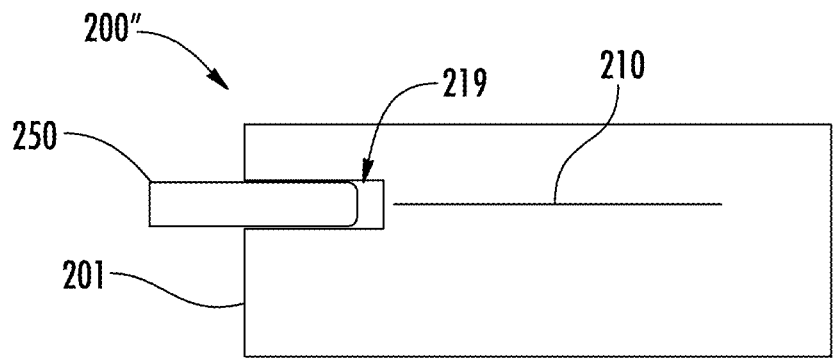
FIGS. 2G and 2H schematically depicts a partial side elevation view of an example waveguide substrate having bores configured to receive ferrules or alignment pins according to one or more embodiments described and illustrated herein.
Figure 2H:
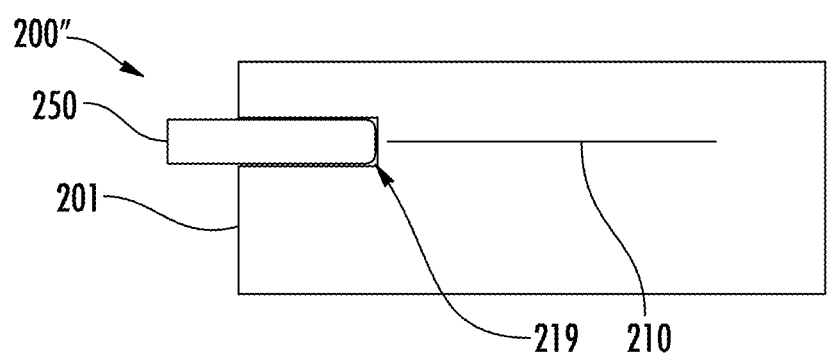

Alignment features may also be provided to receive a ferrule of an optical connector, such as, without limitation, a ferrule of an LC optical connector or an MT-type connector. FIGS. 2G and 2H schematically illustrate side views of a waveguide substrate 200" and a ferrule 250 in a partially mated (FIG. 2G) and a fully mated (FIG. 2H) state. The example waveguide substrate 200" has a ferrule bore 219 within a first surface 201 shaped and sized to receive a ferrule 250. The ferrule bore 219 may be formed within the first surface 201 by the laser-damage-and-etch process as described in detail below. The ferrule bore 219 is registered to a waveguide 210 such than an optical fiber (not shown) within the ferrule 250 is aligned with the waveguide 210 when the ferrule 250 is inserted in to the ferrule bore 219. An index matching gel may be provided within the ferrule bore 219 to minimize back reflection and scattering.

Figure 2I:
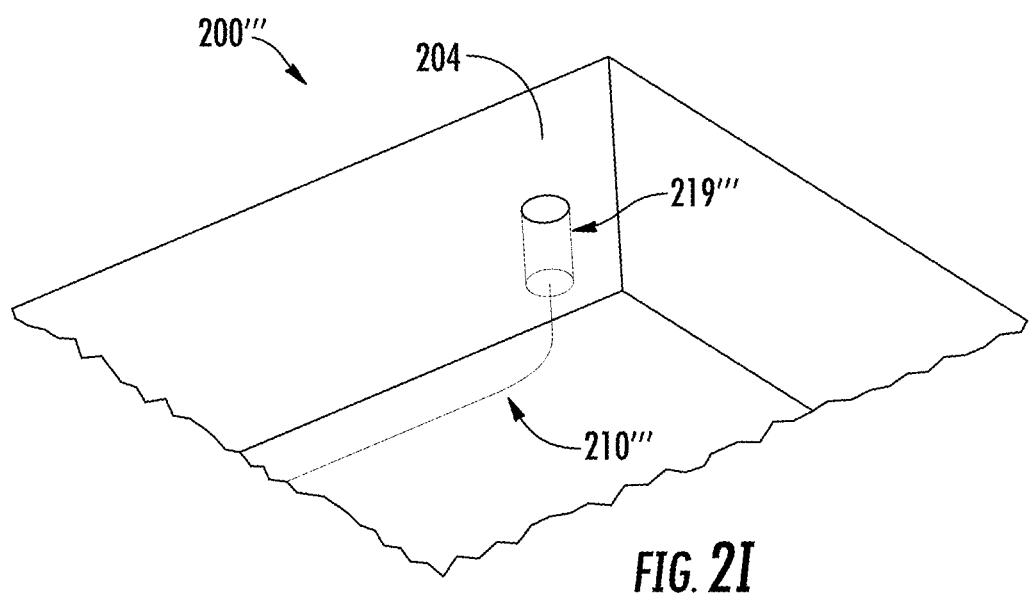
FIG. 2I schematically depicts a front perspective view of an example waveguide substrate having a branching waveguide terminating in a ferrule bore according to one or more embodiments described and illustrated herein.

The ferrule bores described herein may be utilized at any surface of the waveguide substrate. FIG. 2I schematically illustrates an example waveguide substrate 200' having a branching waveguide 210' that terminates within a ferrule bore 219' at the fourth surface 204'. In other words, an output or an input of the branching waveguide is positioned at the ferrule bore 219'. An input of an add-waveguide is positioned at an add ferrule bore. An output of a drop-waveguide is positioned at a drop ferrule bore. The ferrule bores 219' may be utilized to optically couple the branching waveguide 210' (or any waveguide) with a single-fiber optical connector. The ferrule bore 219' depicted in FIG. 2I may be utilized in any of the embodiments described herein. For example, rather than the third pin bores 116B and the fourth pin bores 116D configured to receive alignment pins to optical couple single waveguides to optical connectors as shown in FIGS. 6A-6D and described below, single ferrule bores 219, 219''' may be utilized to receive optical fibers and ferrule of mated optical connectors.

Additional features may be provided around the alignment features (e.g., pin bores and/or ferrule bores) to ensure that the alignment features are properly etched during the etching process. For example, access slots may be provided through or in contact with a bore to more readily allow etching solution to enter the bore and remove material.

Figure 3A:
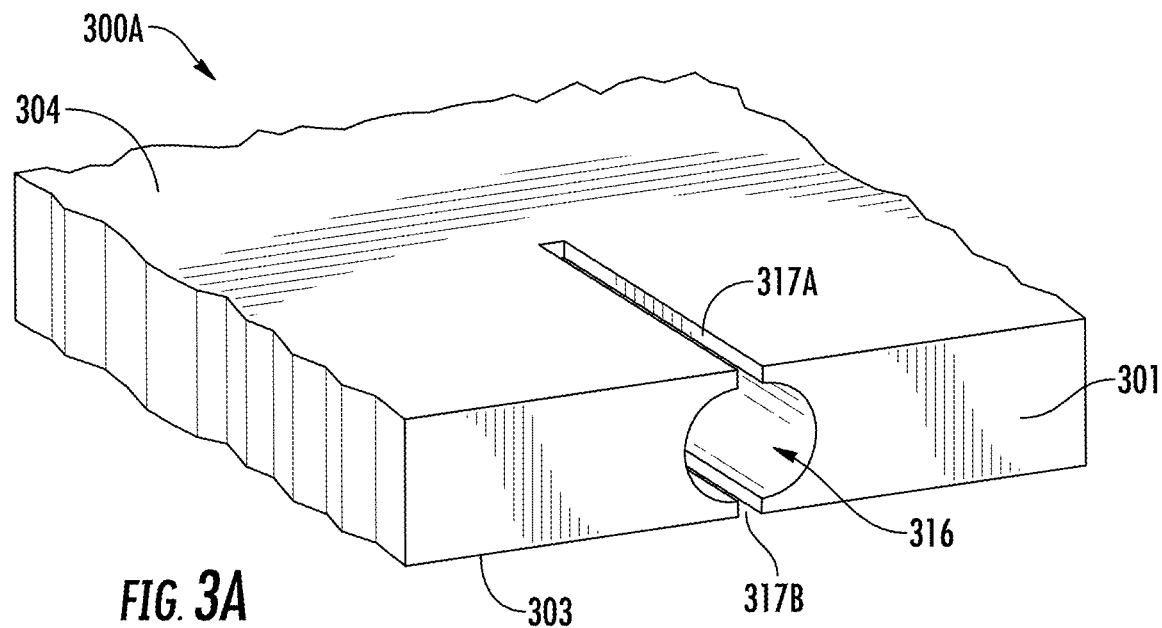
FIGS. 3A and 3B schematically depict example pin bores within an edge of an example waveguide substrate according to one or more embodiments described and illustrated herein.

FIG. 3A schematically depicts an example waveguide substrate 300A having an example pin bore 316 at a first surface 301. The pin bore 316 may be configured to receive an alignment pin or a ferrule of a mated optical connector. The pin bore 316 has a cylindrical shape. However, the pin bore 316 may take on other shapes, such as a slot, for example. Further, pin or ferrule bores may be provided on any surface of the waveguide substrate 300.

A first slot 317A extends from a fourth surface 304 of the waveguide substrate 300 to the pin bore 316, and a second slot 317B extends from a third surface 303 of the waveguide substrate 300 to the pin bore 316. The first slot 317A and the second slot 317B provide additional paths for the etching solution to more easily reach all laser-damaged regions around the perimeter of the pin bore 316. Only one slot may be provided in embodiments, and that the slots described herein may be provided between surfaces of the waveguide substrate 300 and any desired alignment feature.

Figure 3B:
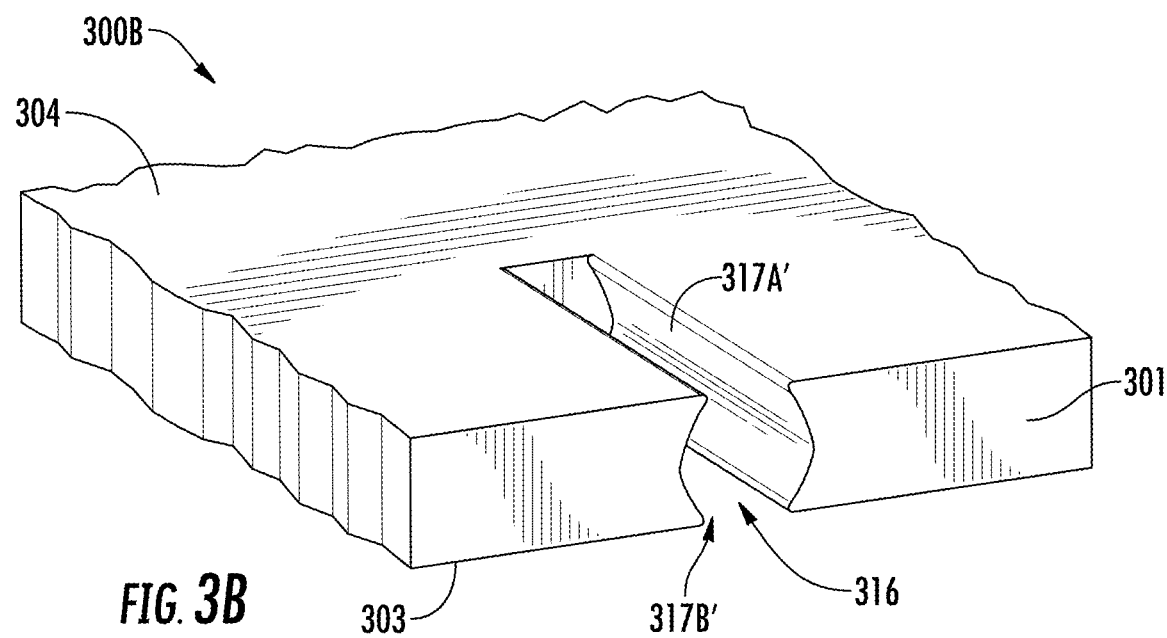

Depending on the thickness of the waveguide substrate, it is possible that the diameter of the alignment pin and/or ferrule of the mated optical connector will exceed the thickness of the waveguide substrate. In this case, the first slot 317A' and the second slot 317B' may have a width large enough to accommodate the top and bottom of the guide pin so that the top and bottom of the guide pin extend above the third surface 303 and the fourth surface 304 of the waveguide substrate 300B, respectively, as shown in FIG. 3B. Thus, the pin bore 316' will only contact the guide pin on its left and right sides. Alternatively, the pin bore center may be biased towards one surface (e.g., third surface 303) so that only the top of guide pin extends above the third surface 303, while the bottom of the guide pin remains completely within the waveguide substrate (with or without a vertical slot 317B).

Figure 3C:
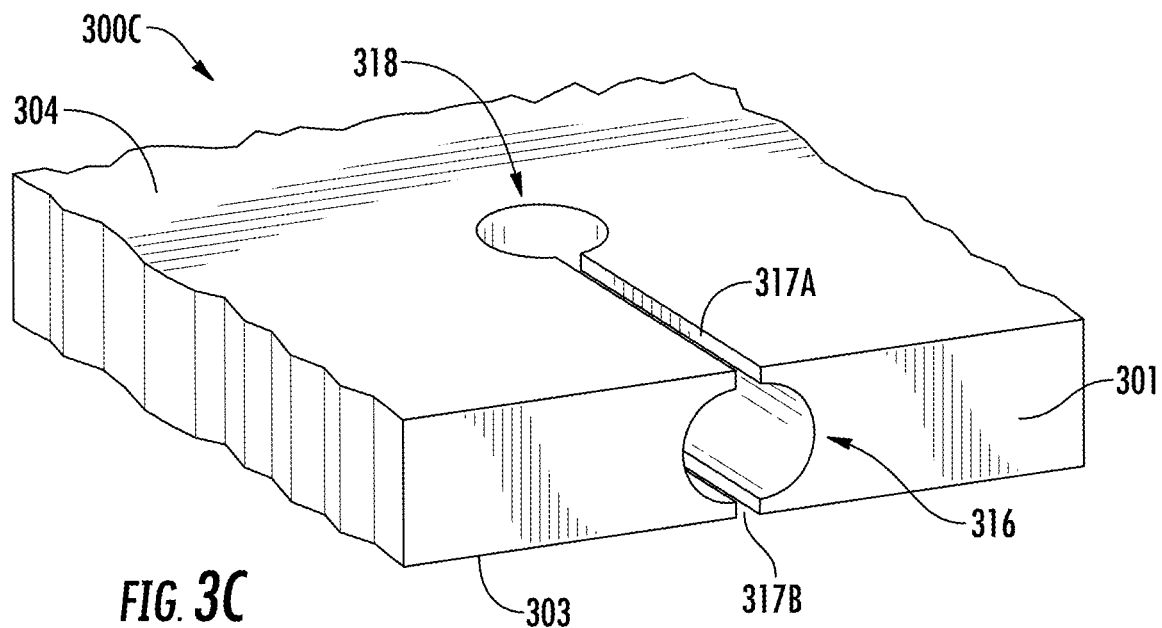
FIG. 3C schematically depicts an example pin bore with a vertical hole in an example waveguide substrate according to one or more embodiments described and illustrated herein.

In some embodiments, enhanced etching solution flow to the laser damaged region of the pin bore may be provided by additional features. FIG. 3C schematically depicts a partial view of a waveguide substrate 300C having a first surface 301, a third surface 303 and a fourth surface 304. The waveguide substrate 300C has a pin bore 316, a first slot 317A, and a second slot 317B as depicted in FIG. 3A. However, the waveguide substrate 300 further includes a vertical hole 318 through the first slot 317A, the pin bore 316 and the second slot 317B at an end of the pin bore 316 that is distal from the first surface 301. The vertical hole 318 provides additional access to the pin bore 316 to etch the material away within the pin bore 316. If the vertical hole 318 is laser damaged around its entire perimeter, it will drop out during etching, increasing the opportunity for etchant liquids to flow to the laser damaged regions that define the pin bore 316.

Figure 3D:
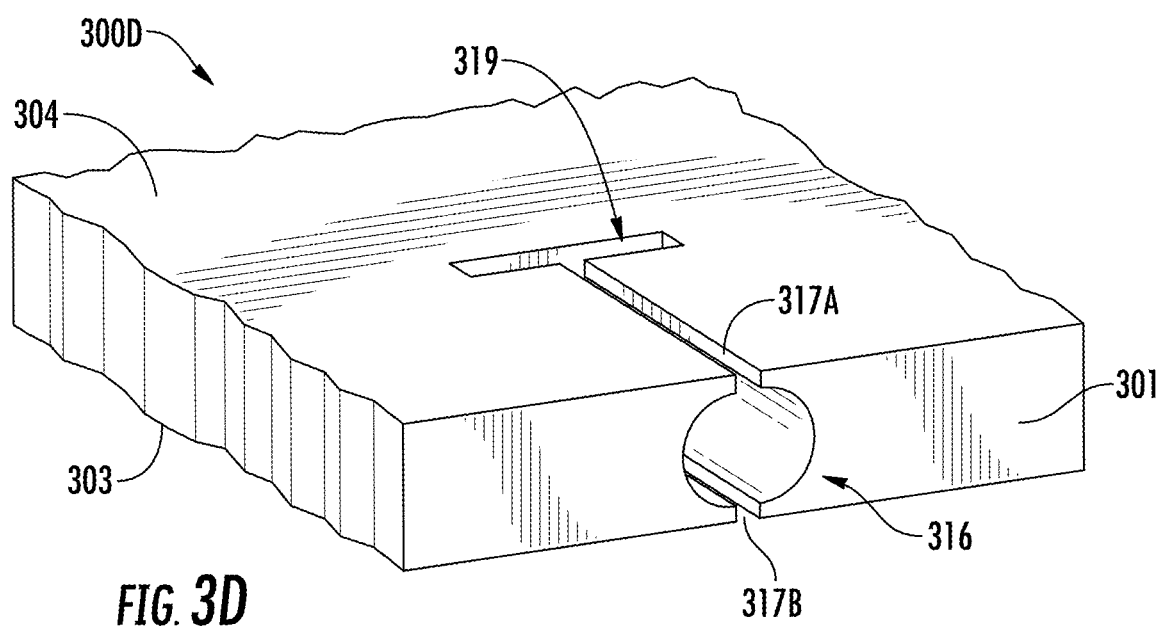
FIG. 3D schematically depicts an example pin bore with a vertical slot in an example waveguide substrate according to one or more embodiments described and illustrated herein.

FIG. 3D schematically depicts a partial view of a waveguide substrate 300D having a first surface 301, a third surface 303, and a fourth surface 304. The waveguide substrate 300D has a pin bore 316, a first slot 317A, and a second slot 317B as depicted in FIG. 3A. However, the waveguide substrate 300D further includes an additional vertical slot 319 through the first slot 317A, the pin bore 316 and the second slot 316B at an end of the pin bore 316 that is distal from the first surface 301. The additional vertical slot 319 provides additional access to the pin bore 316 to etch the material away within the pin bore 316.

Figure 3E:
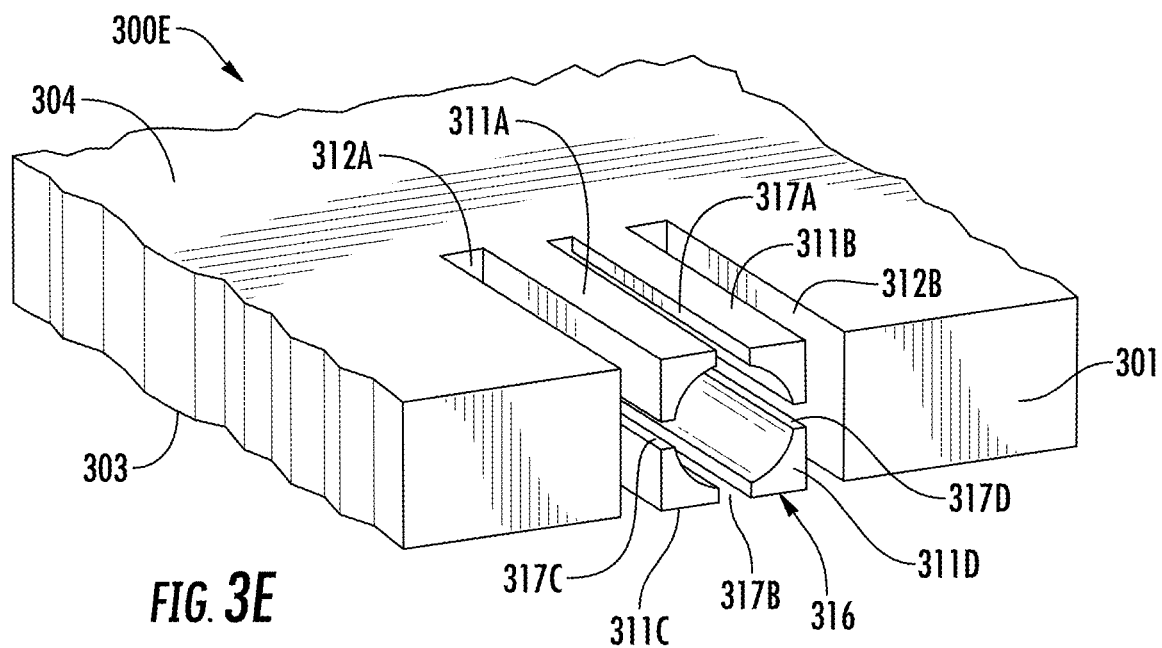
FIG. 3E schematically depicts an example pin bore with several slots in an example waveguide substrate according to one or more embodiments described and illustrated herein.

Additional features may be provided to increase access to the pin bore for the etching solution. FIG. 3E illustrates a partial view of another example waveguide substrate 300E. The waveguide substrate 300E has a first vertical slot 317A extending from the fourth surface 304 to the pin bore 316 and a second vertical slot 317B extending from the third surface 1203 to the pin bore 316. The waveguide substrate 300E further includes a first additional slot 312A disposed on a first side of the pin bore 316, and a second additional slot 312B disposed on a second side of the pin bore 316. To provide even greater etching solution access to the pin bore 316, the waveguide substrate 300E further includes a third slot 317C extending from the pin bore 316 to the first additional slot 312A, and a fourth slot 317D extending from the pin bore 316 to the second additional slot 312B. These various slots result in a first pin bore arm 311A, a second pin bore arm 311B, a third pin bore arm 311C and a fourth pin bore arm 311D. These pin bore arms may provide for compliance to enable an alignment pin to be inserted.

Figure 3F:
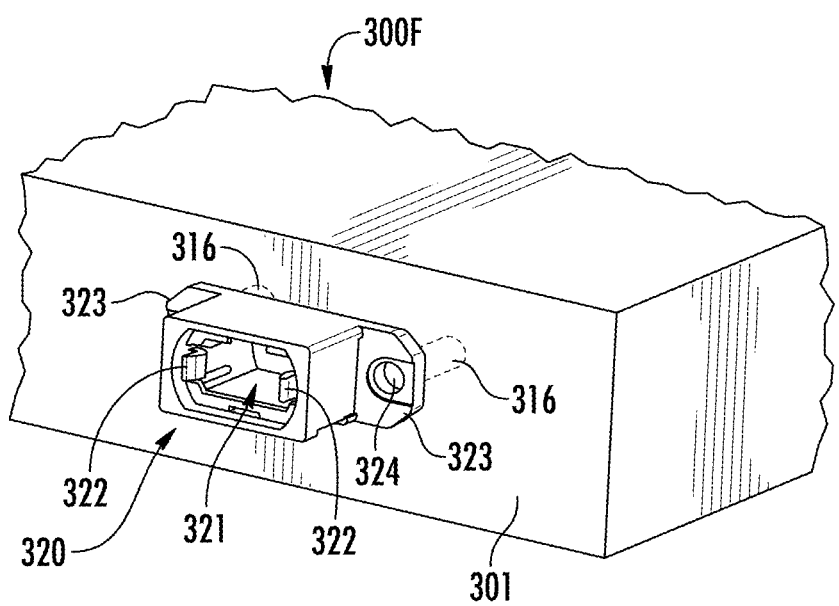
FIG. 3F schematically depicts a waveguide substrate having an adapter housing coupled to a first surface according to one or more embodiments described and illustrated herein.
Figure 4A:
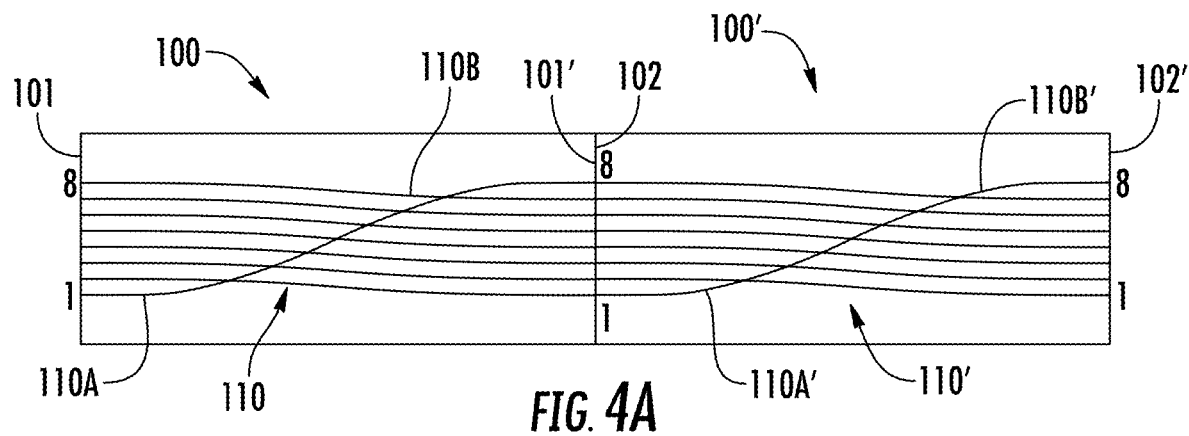
FIG. 4A schematically depicts top view of two example concatenated waveguide substrates each including a drop-waveguide and an add-waveguide according to one or more embodiments described and illustrated herein.
Figure 4B:
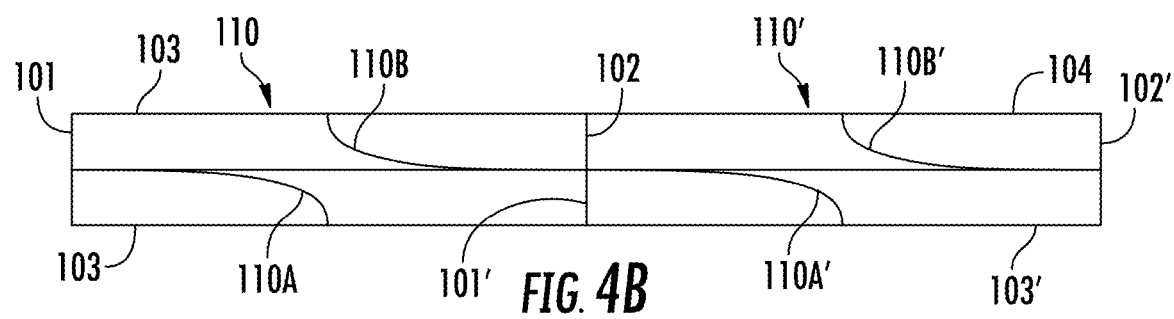
FIG. 4B schematically depicts a side elevation view of the two example concatenated waveguide substrates depicted in FIG. 4A.
Figure 4C:
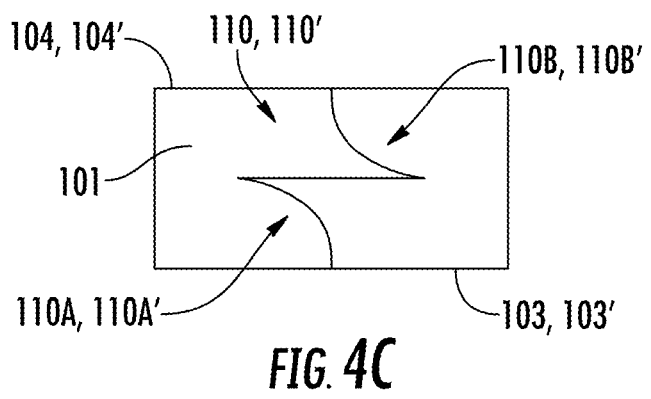
FIG. 4C schematically depicts a front elevation view of the two example concatenated waveguide substrates depicted in FIG. 4A.
Figure 4D:
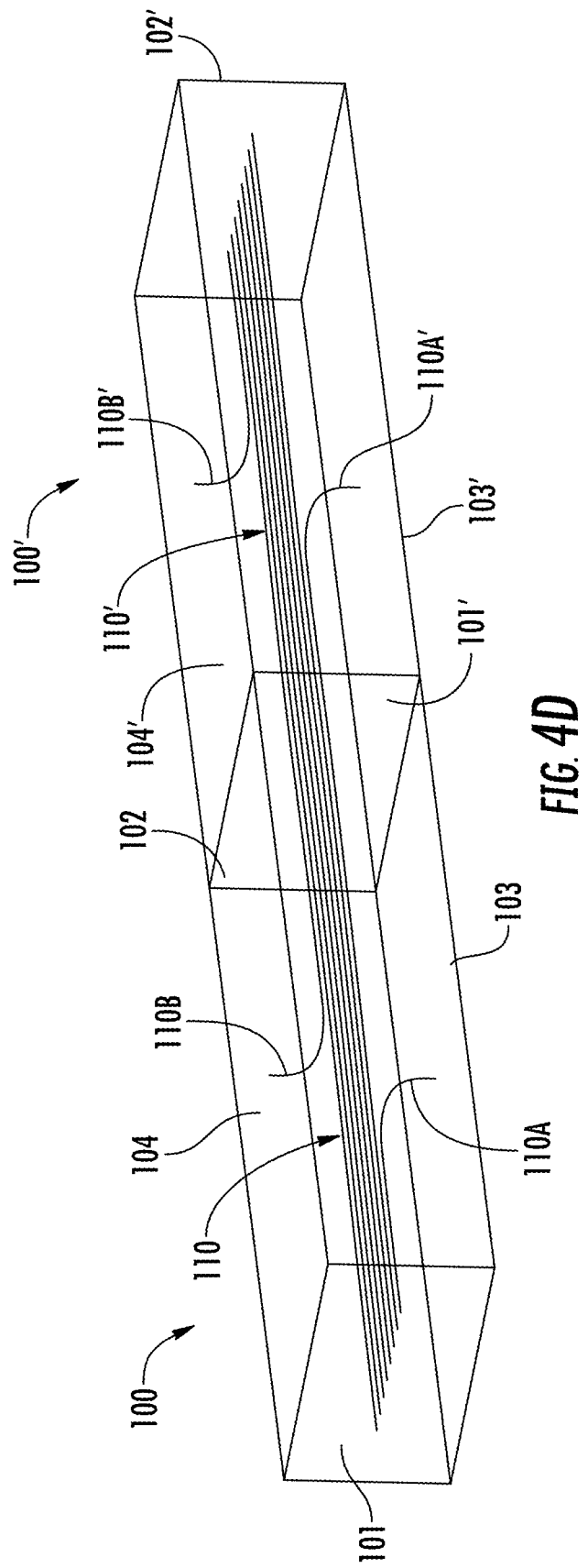
FIG. 4D schematically depicts a side elevation view of the two example concatenated waveguide substrates depicted in FIG. 4A.

Adapter housings may be coupled to surfaces of the waveguide substrate to provide optical connection to the ends of the waveguides disposed within the waveguide substrate. The configuration of adapter housing is not limited by this disclosure. FIG. 3F schematically illustrates a waveguide substrate 300F having an adapter housing 320 coupled to a first surface 301. The example adapter housing 320 is configured to receive a multi-fiber optical connector through an opening 321. In some embodiments, the adapter housing 320 may include one or more latch arms 322 to releasably engage an optical connector within the opening 321. The adapter housing 320 may be fabricated of any suitable material such as, without limitation, a molded polymer. The example adapter housing 320 includes two tabs 323 that include mounting holes 324 for aligning with pin bores 316 within the first surface 301 of the waveguide substrate 300F. Pins or other fasteners may be disposed within the mounting holes 324 and pin bores 316 to coarsely align and secure the adapter housing to the waveguide substrate 300F. Pin bores and/or ferrule bores may be provided at the first surface 301 (or other surfaces) to receive alignment pins and/or ferrule(s) for fine alignment between the optical fibers of the optical connector (not shown) and the waveguides disposed within the waveguide substrate 300F as described herein.

Referring now to FIGS. 4A-4D, multiple waveguide substrates may be concatenated to form a waveguide substrate assembly. FIGS. 4A-4D schematically illustrate various views of a first waveguide substrate 100 coupled to a second waveguide substrate 100'. In some embodiments, pin bores and alignment pins as described above are provided to couple multiple waveguide substrates together. Other means for coupling multiple waveguide substrates together may be utilized.

In the illustrated embodiment, a second surface 102 of the first waveguide substrate 100 is coupled to a first surface 101' of the second waveguide substrate 100'. The first waveguide substrate 100 has a first plurality of waveguides 110, including a drop-waveguide 110A and an add-waveguide 100B. Similarly, the second waveguide substrate 100' includes a second plurality of waveguides 110' including a drop-waveguide 110A' and an add-waveguide 110B'. The drop-waveguides 110A, 110A' extend from a first input position at first surfaces 101, 101' to fourth surfaces 104, 104', respectively.

Waveguides 110, 110' at input positions 2-8 are indexed to output positions 1-7 at the second surfaces 102, 102'. In the illustrated example, add-waveguide 110B extends from the third surface 103 to the eighth output position at the second surface 102 of the first waveguide substrate 100. Similarly, add-waveguide 110B' extends from the third surface 103' to the eighth output position at the second surface 102' of the second waveguide substrate 100'. Waveguides 110 at input positions 2-8 of the first waveguide substrate 100 are optically coupled to waveguides 110' at input positions 1-7 of the second waveguide substrate 100'. Add-waveguide 110B of the first waveguide substrate 100 is optically coupled to the waveguide 110' at the eighth input position of the second waveguide substrate 100'. Add-waveguide 110B' is provided at the eighth output position of the second waveguide substrate 100'.

Figure 5:
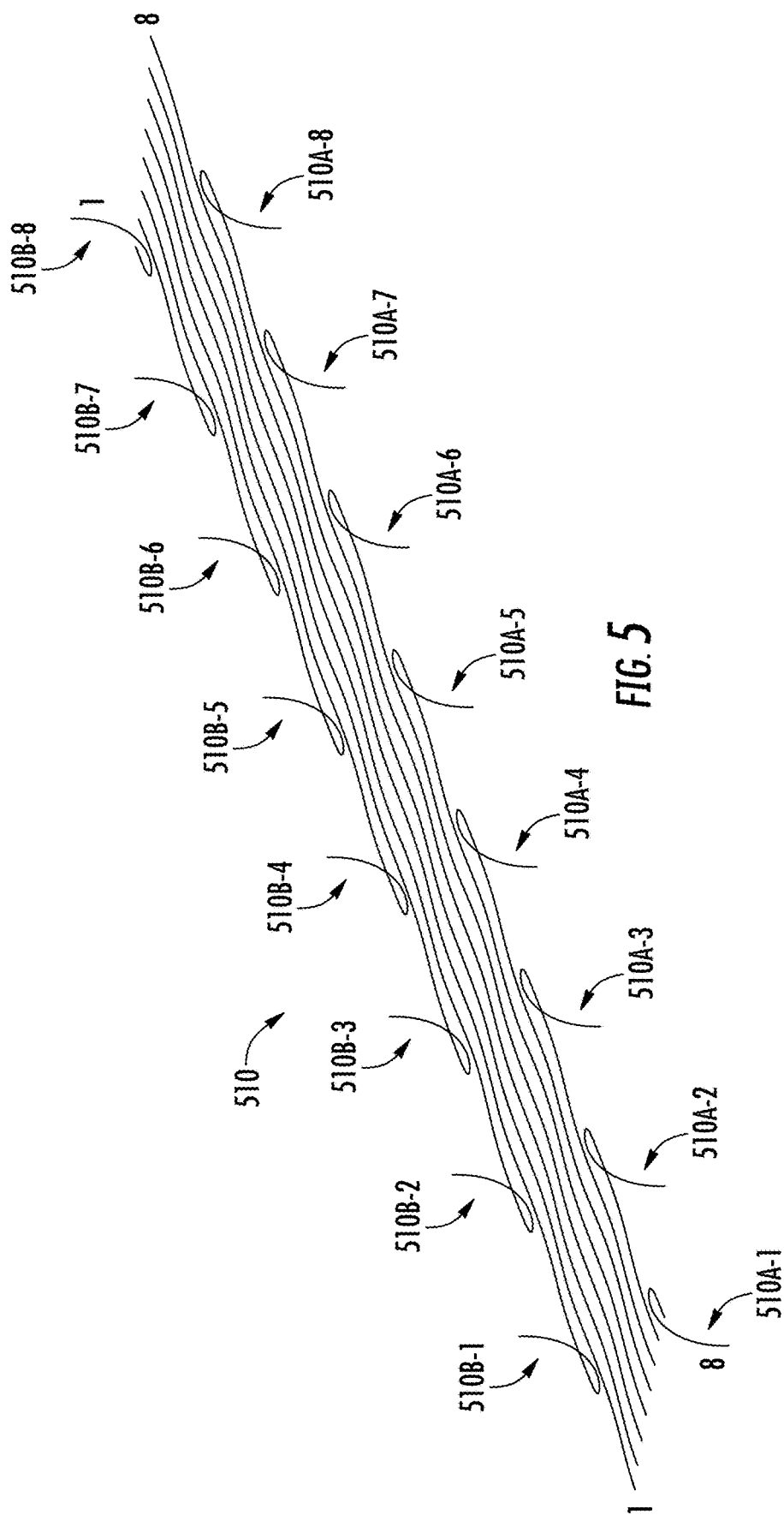
FIG. 5 schematically depicts waveguides of eight concatenated waveguide substrate in isolation according to one or more embodiments described and illustrated herein.
Figure 6A:
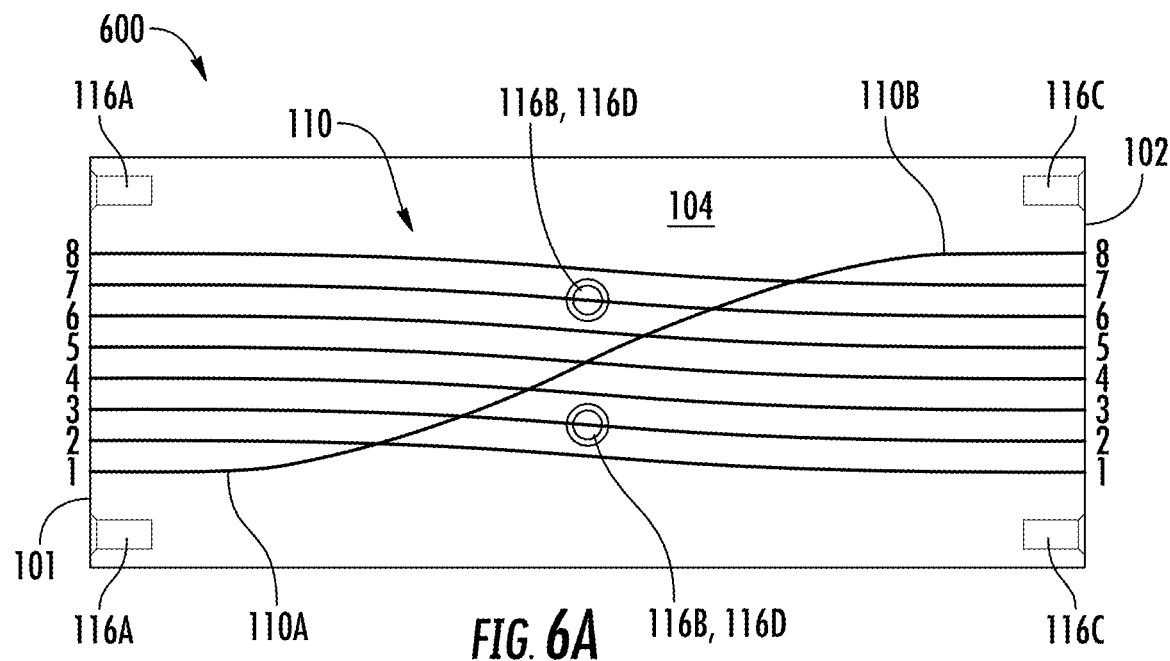
FIG. 6A schematically depicts an example waveguide substrate having an add-waveguide, a drop-waveguide and a plurality of pin bores according to one or more embodiments described and illustrated herein.
Figure 6B:
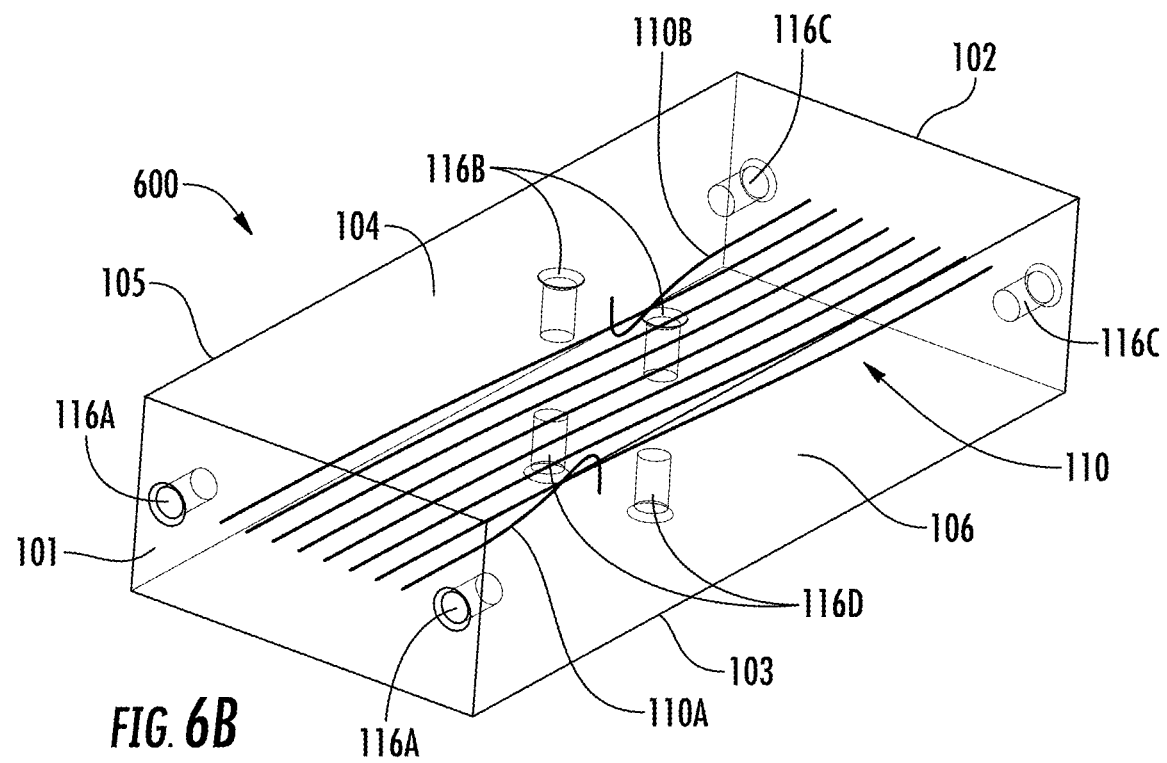
FIG. 6B schematically depicts a perspective view of the example waveguide substrate depicted in FIG. 6A.
Figure 6C:
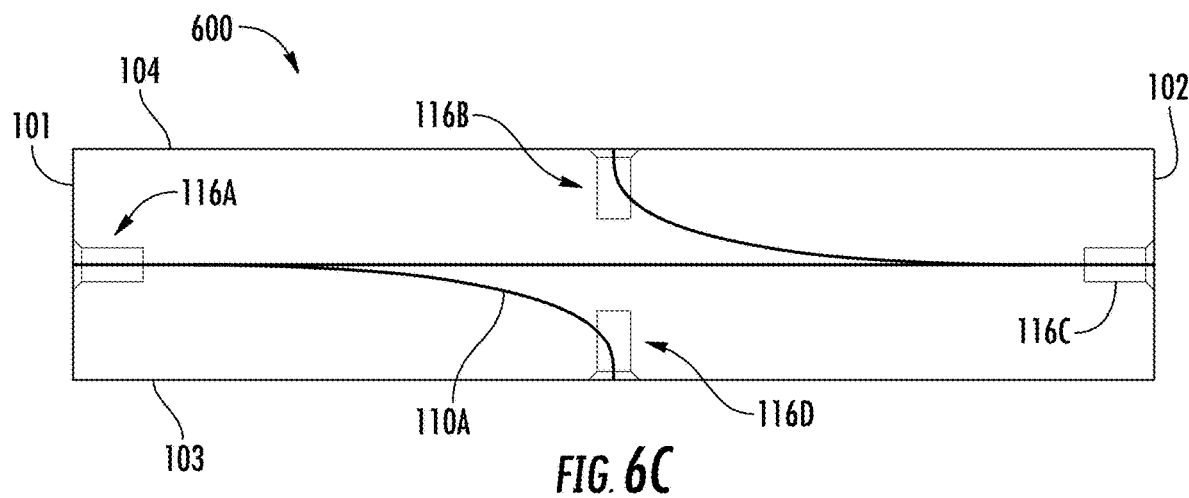
FIG. 6C schematically depicts a side elevation view of the example waveguide substrate depicted in FIG. 6A.
Figure 6D:
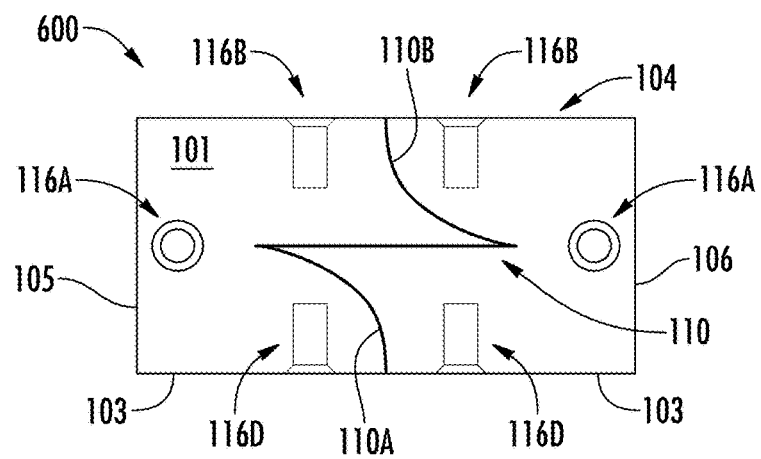
FIG. 6D schematically depicts a front elevation view of the example waveguide substrate depicted in FIG. 6A.
Figure 7A:
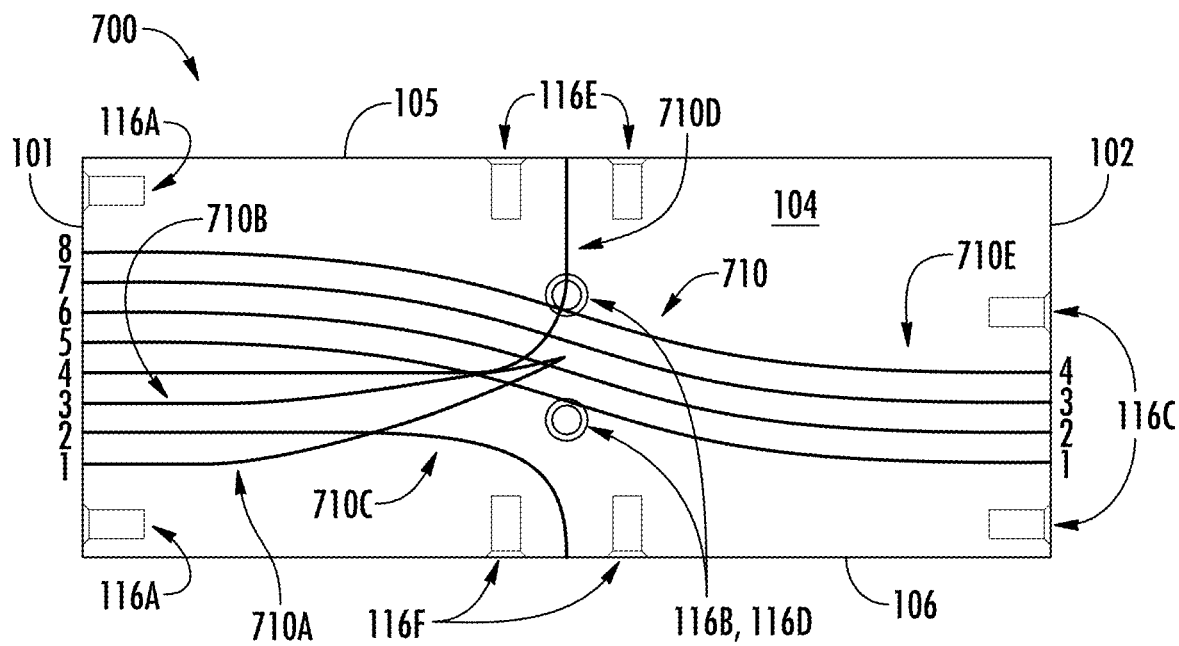
FIG. 7A schematically depicts a top view of an example waveguide substrate having four drop-waveguides and a plurality of pin bores according to one or more embodiments described and illustrated herein.
Figure 7B:
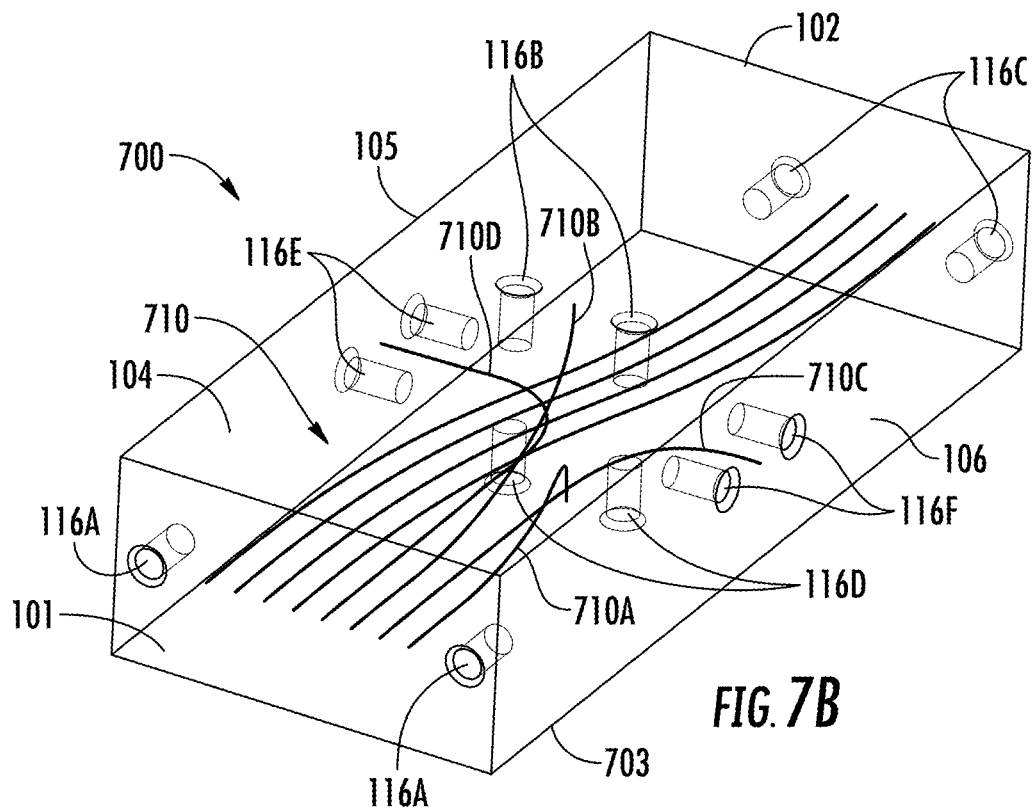
FIG. 7B schematically depicts a perspective view of the example waveguide substrate depicted in FIG. 7A.
Figure 7C:
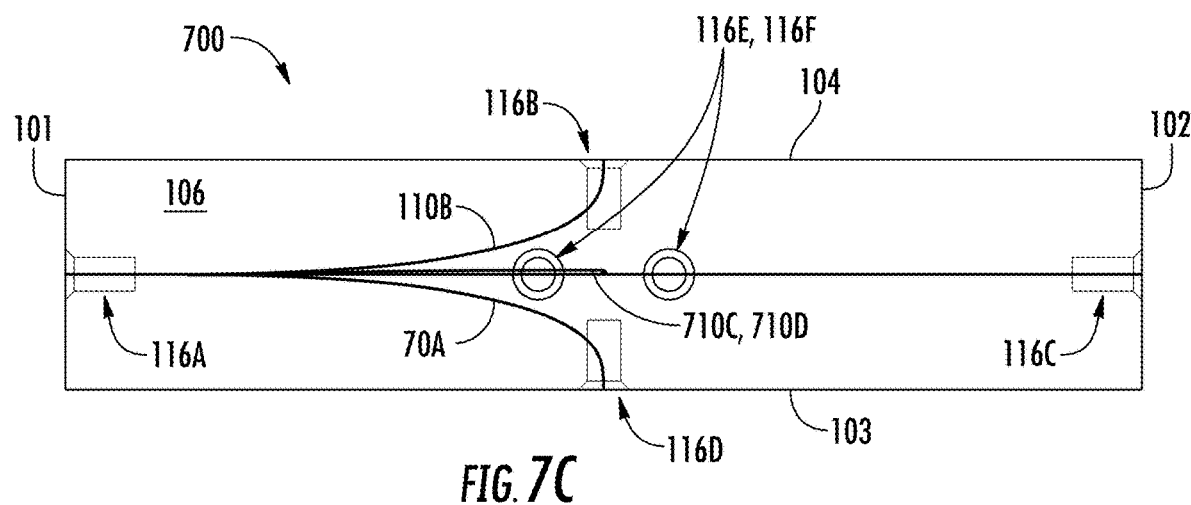
FIG. 7C schematically depicts a side elevation view of the example waveguide substrate depicted in FIG. 7A.
Figure 7D:
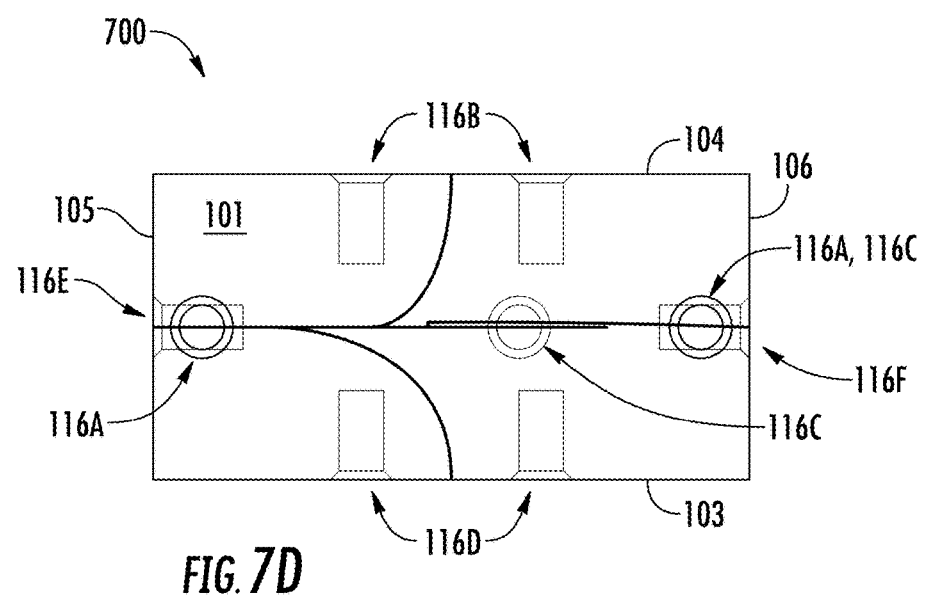
FIG. 7D schematically depicts a front elevation view of the example waveguide substrate depicted in FIG. 7A.

Any number of waveguide substrates may be concatenated. FIG. 5 illustrates a plurality of waveguides 510 of waveguide substrates in isolation. Drop-waveguides 510A-1-510A-8 are dropped and add-waveguides 510B-1-510B-8 are added in respective waveguide substrates (not shown in FIG. 5) such that each of the original waveguides provided at an input of the assembly are dropped. This may result in a long configuration that may not be suitable for compact packaging. As an alternative, the surfaces 101 and 102 may be angle-cut to allow the series of waveguide substrates to be joined together to form a curved profile instead of a straight line. This configuration distributes the drop or add/drop connections around a point instead of along a line, which allows the packaging enclosure for the waveguide substrates to be smaller.

As described above, pin bores may be provided within surfaces of the waveguide substrate to provide fine alignment between waveguides. FIGS. 6A-6D schematically illustrate various views of a waveguide substrate 600 similar to the waveguide substrate 100 shown in FIGS. 1A-1F except that pin bores 116A, 116B, 116C, and 116D are provided to receive alignment pins of optical connectors. As an example, and not a limitation, the depth of the pin bores 116A, 116B, 116C, and 116D may be within a range of 500 μm to 5000 μm, including endpoints. The pin bores 116A, 116B, 116C, and 116D include a tapered entrance portion, as described above.

Particularly, first pin bores 116A are provided at the first surface 101 such that the waveguide inputs are between the first pin bores 116A, and the first pin bores 116A are configured to receive alignment pins of a multi-fiber connector. Similarly, second pin bores 116C are provided at the second surface 102 such that waveguide outputs are between the second pin bores 116C, and the second pin bores 116C are configured to receive alignment pins of a multi-fiber connector.

Third pin bores 116B are provided at the fourth surface 104 such that an input of the add-waveguide 110B is disposed between the third pin bores 116B. Thus, third pin bores 116B are add pin bores. Fourth pin bores 116D are provided at the third surface 103 such that an output of the drop-waveguide 110A is disposed between fourth pin bores 116D. Thus, fourth pin bores 116D are drop pin bores.

Any number of add- and drop-waveguides may be provided within the waveguide substrate. FIGS. 7A-7D illustrate an example waveguide substrate 700 similar to that of waveguide substrate illustrated by FIGS. 6A-6D except that there are four drop-waveguides and no add-waveguides, fifth pin bores 116E and sixth pin bores 116F. Particularly, the example waveguide substrate 700 has a plurality of waveguides 710. Among the plurality of waveguides 710 is a first drop-waveguide 710A, a second drop-waveguide 710B, a third drop-waveguide 710C, and a fourth drop-waveguide 710D. The first through fourth drop-waveguides are provided at input positions 1-4 but embodiments are not limited thereto. In the illustrated embodiment, four through-waveguides 710E are provided to the second surface 102 at output positions 1-4. Thus, drop-waveguide outputs are provided at four surfaces in the waveguide substrate 700: the third surface 103, the fourth surface 104, the fifth surface 105 and the sixth surface 106. In this example, M=8, N=4, Q=0, P=4. Any drop-waveguides may be incident on exterior surfaces at zero angle, or near-right angles (e.g., 8° off normal). Alternatively, side surfaces 105 and 106 may be diced at an angle to create the required waveguide angle where it meets the surface.

Figure 8A:
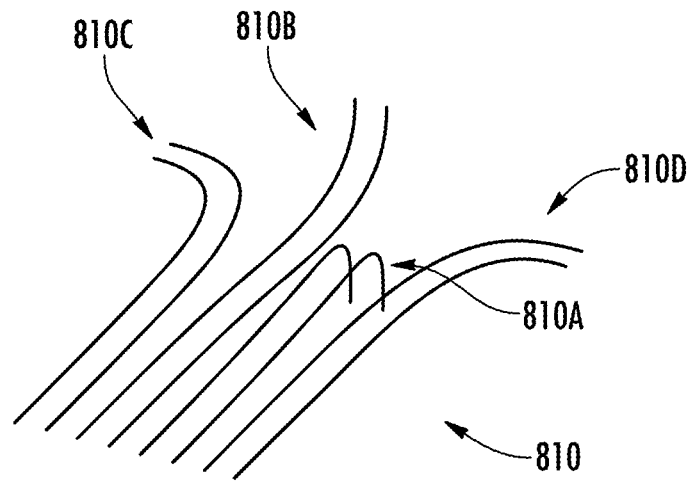
FIG. 8A schematically depicts a perspective view of a plurality of waveguides having eight drop-waveguides according to one or more embodiments described and illustrated herein.
Figure 8B:
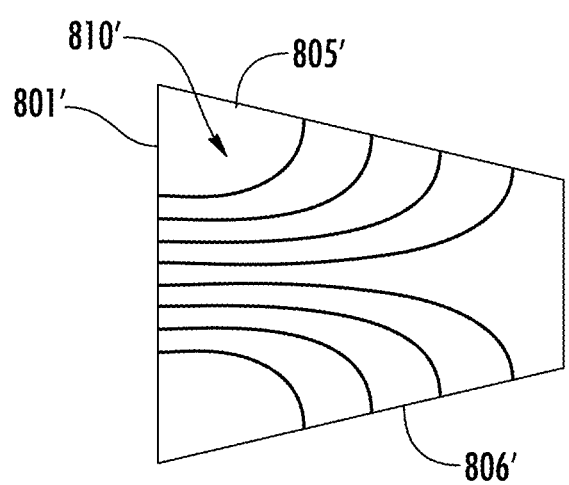
FIG. 8B schematically depicts a top view of a plurality of waveguides having eight lateral drop waveguides according to one or more embodiments described and illustrated herein.

FIG. 8A schematically illustrates a plurality of waveguides 810 in isolation wherein pairs of drop-waveguides are dropped, and none of the waveguides 810 reach the opposite output edge (i.e., second surface). In this example, M=N=8. In the illustrate example the pairs of drop-waveguides take the shortest path to an adjacent edge without interfering with other waveguides. First drop-waveguides 810A turn downward, second drop-waveguides 810B turn upward, and the third drop-waveguides 810C and the fourth drop-waveguides 810D turn laterally. Pairs of drop-waveguides may provide for duplex connectors that provide bi-directional links, for example. FIG. 8B schematically illustrates another embodiment wherein a plurality of waveguides 810' extend from a surface 801' and laterally turn to terminate at adjacent surfaces 805' and 806'.

Figure 9A:
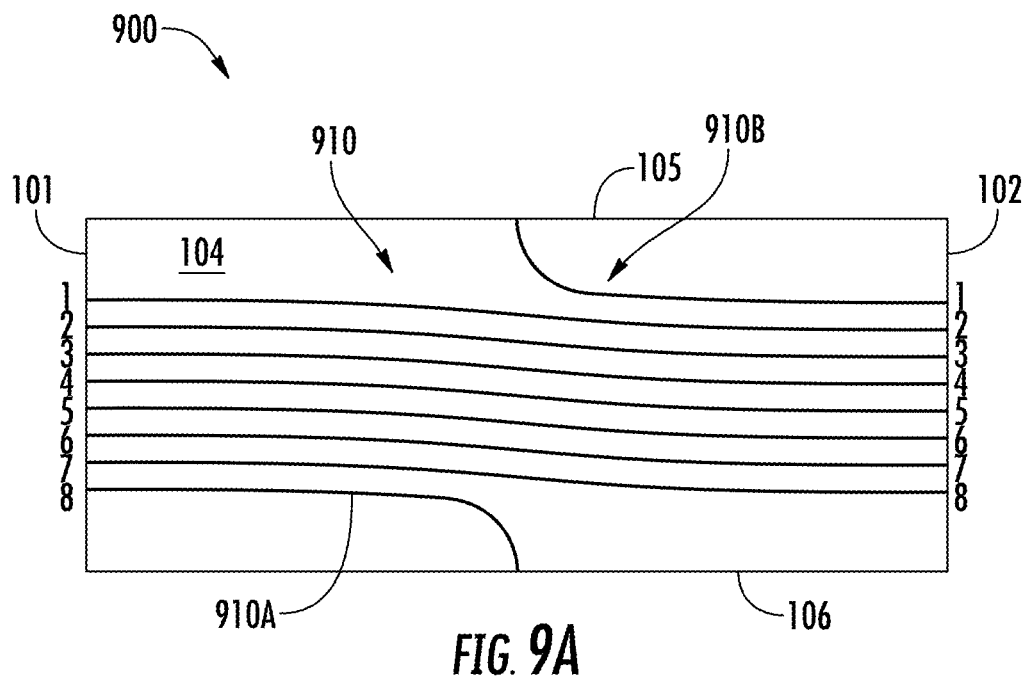
FIG. 9A schematically depicts a top view of an example waveguide substrate having a lateral drop-waveguide and a lateral add-waveguide according to one or more embodiments described and illustrated herein.
Figure 9B:
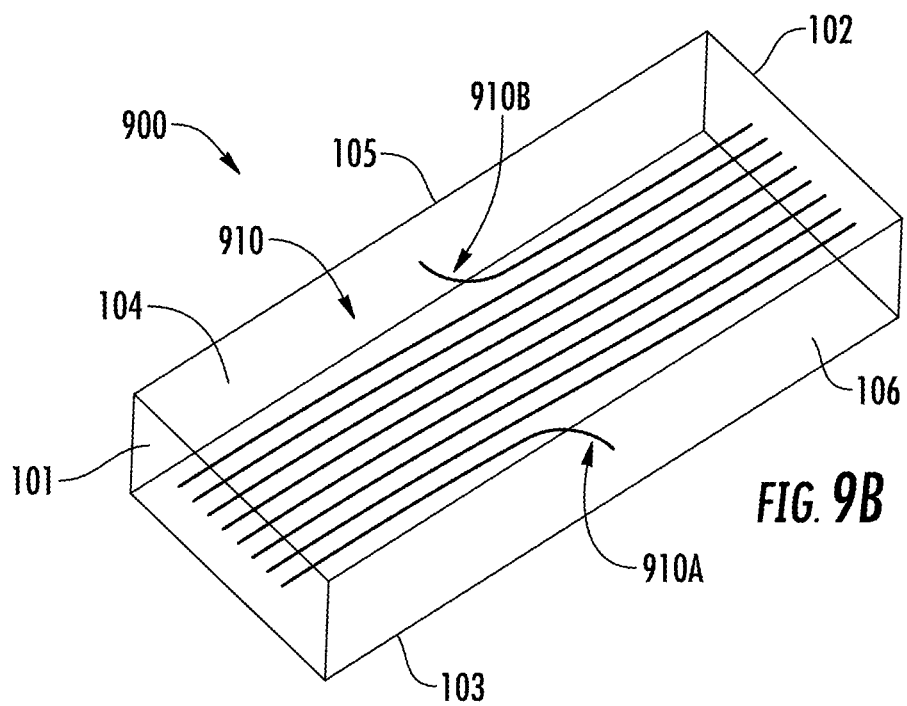
FIG. 9B schematically depicts a perspective view of the example waveguide substrate depicted in FIG. 9A.

FIGS. 9A and 9B schematically depict an example waveguide 900 similar to the waveguide depicted in FIGS. 1A-1F except that a drop-waveguide 910A of a plurality of waveguides 910 turns laterally to the sixth surface 106, and the input of an add-waveguide 910B is at the fifth surface 105. A lateral turn may enable a larger bend radius than turns toward an upper surface and a lower surface of a thin waveguide substrate, which may minimize optical loss.

As described above, the waveguides described herein may be fabricated by a laser-writing process, and the various alignment features may be fabricated by a laser-damage-and-etch process using the same laser used to form the waveguides.

A short-pulsed laser (e.g., picosecond laser or femtosecond laser) may be used to create three dimensional waveguides in the material of the waveguide substrate. The short-pulsed laser is tightly focused into material, which changes the material structure and raises the refractive index. By controlling the laser position via translation stages, waveguides may be created anywhere with the waveguide substrate. And by controlling the laser power and scan speed, single mode waveguides of low optical loss are possible.

Further, modification of refractive index in a waveguide substrate by a short-pulsed laser which alters the structural properties within the focal area (dependent on laser power and process time) allows definition of alignment features (e.g., pin holes, fiber ferrule holes, v-grooves and the like) with a subsequent etching step. After the alignment features are defined by the laser damage process, an etchant is applied to the waveguide substrate to form the alignment features. For example, the etchant may include hydrofluoric acid. Altering the structural properties makes the anisotropic etching highly selective, i.e., the etch rate of the laser-damaged area is much higher than the non-exposed areas of the waveguide substrate.

Using the same laser system to write the waveguides as to form the definition of alignment features allows for registration between the waveguides and the etched alignment features. Particularly, regions of the waveguides or the alignment features may be used as reference fiducials when laser-writing the other of the waveguides and alignment features. Registration between the waveguides and the alignment features allows for precise alignment between the waveguides and the alignment features, and thus precise alignment between the waveguides and optical fibers of optical connectors coupled to the waveguide substrate using the alignment features.

Figure 10A:
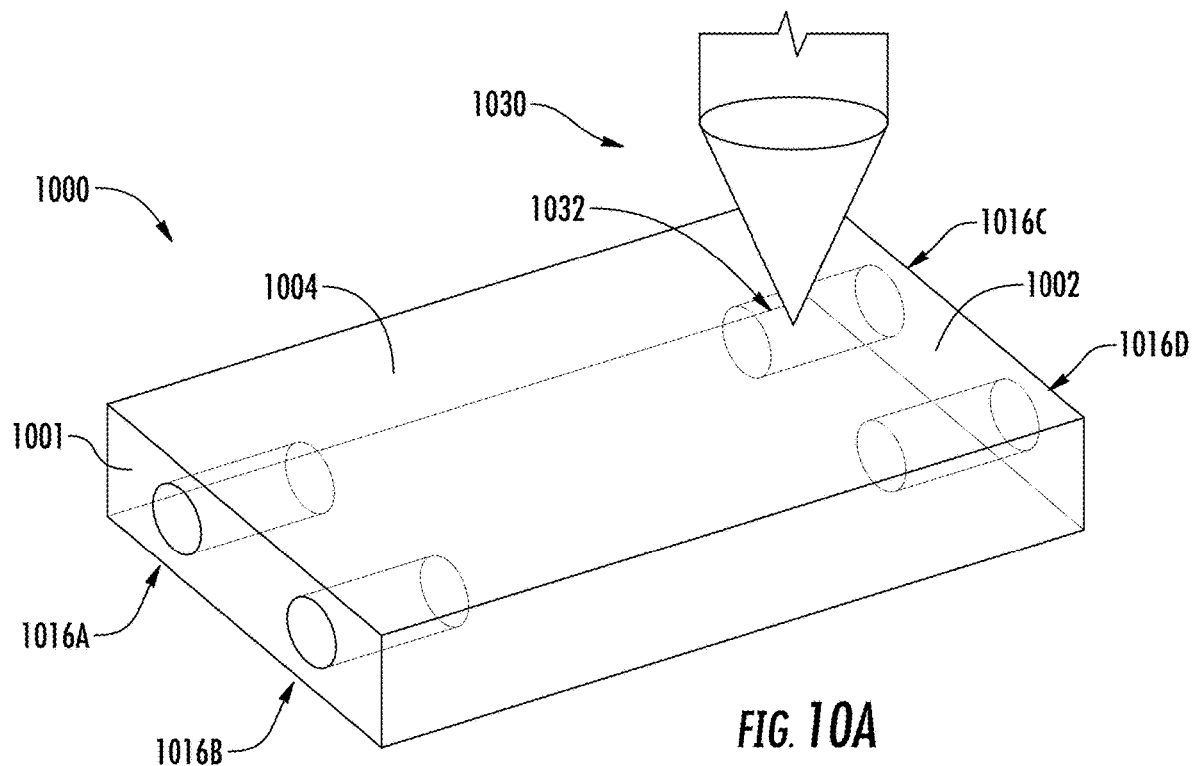
FIG. 10A schematically depicts a perspective view of an example laser method for forming alignment features in an example waveguide substrate according to one or more embodiments described and illustrated herein.

FIG. 10A schematically illustrates a laser 1030 producing a sub-picosecond pulsed laser beam 1032 that is focused into a waveguide substrate 1000 through the fourth surface 1040. In the illustrated embodiment, the laser 1030 is used to define alignment features configured as a first pin bore 1016A, a second pin bore 1016B, a third pin bore 1016C, and a fourth pin bore 1016D prior to laser-writing waveguides. The laser beam 1032 damages the glass material of the waveguide substrate 1000 such that the damages areas will be removed by the etching solution during the subsequent etching process.

Figure 10B:
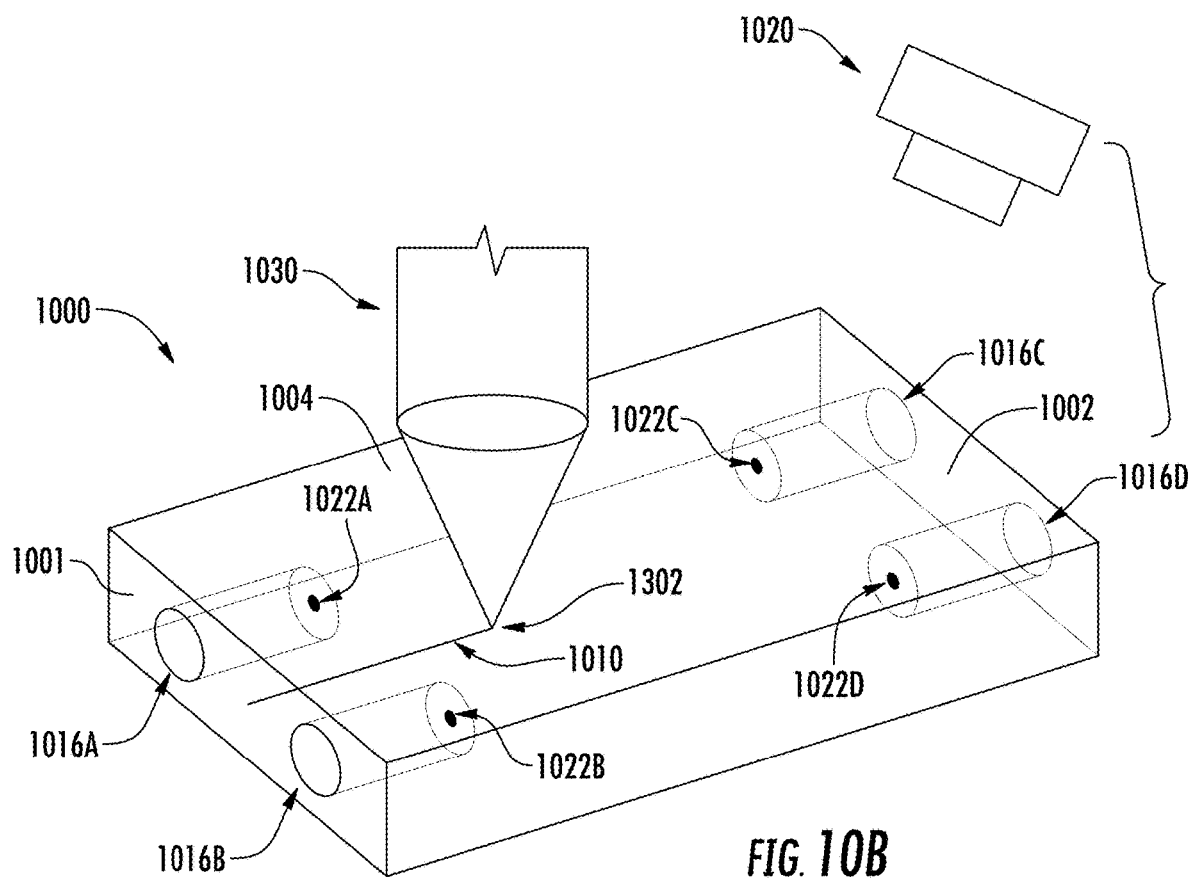
FIG. 10B schematically depicts a perspective view of an example laser method for forming a waveguide in the example waveguide substrate depicted in FIG. 10A according to one or more embodiments described and illustrated herein.

Referring now to FIG. 10B, a waveguide 1010 is shown as being written into the waveguide substrate 1000 by the laser beam 1032 of the laser 1030. A vision system 1020 is utilized to control the position of the laser beam 1032 within or on the waveguide substrate 1000 by monitoring one or more areas of the pin bores 1016A-1016D as reference fiducials. In the illustrated embodiment, a first reference fiducial 1022A is provided at the first pin bore 1016A, a second reference fiducial 1022B is provided at the second pin bore 1016B, a third reference fiducial 1022C is provided at the third pin bore 1016C, and a fourth reference fiducial 1022D is provided at the fourth pin bore 1016D. Any number of reference fiducials may be provided by any number of alignment features. Thus, the vision system 1020 tracks the reference fiducials 1022A-1022D as the one or more waveguides 1010 are written such that the one or more waveguides 1010 are registered to the pin bores 1016A-1016D. The waveguides may be written first prior to the writing the alignment features.

In some cases, the material is modified up to a certain distance from the edge of the waveguide substrate. For example, the laser may form the waveguides and/or defined areas of the alignment features up to about 10 μm from the edge of the waveguide. To accommodate this distance from the waveguides and/or defined areas of the alignment features to the edge, the edges of the waveguide may be polished. Another way to accommodate this distance, multiple waveguides and defined areas of the alignment features may be formed in a mother-sheet, and the mother sheet may be singulated prior to chemical etching such that the damaged areas of the defined alignment features are exposed and available to receive chemical etchant. Another way to accommodate this distance is to employ evanescent coupling to external waveguides (e.g., D-shaped fibers), where waveguides are written parallel to the surface.

Figure 11:
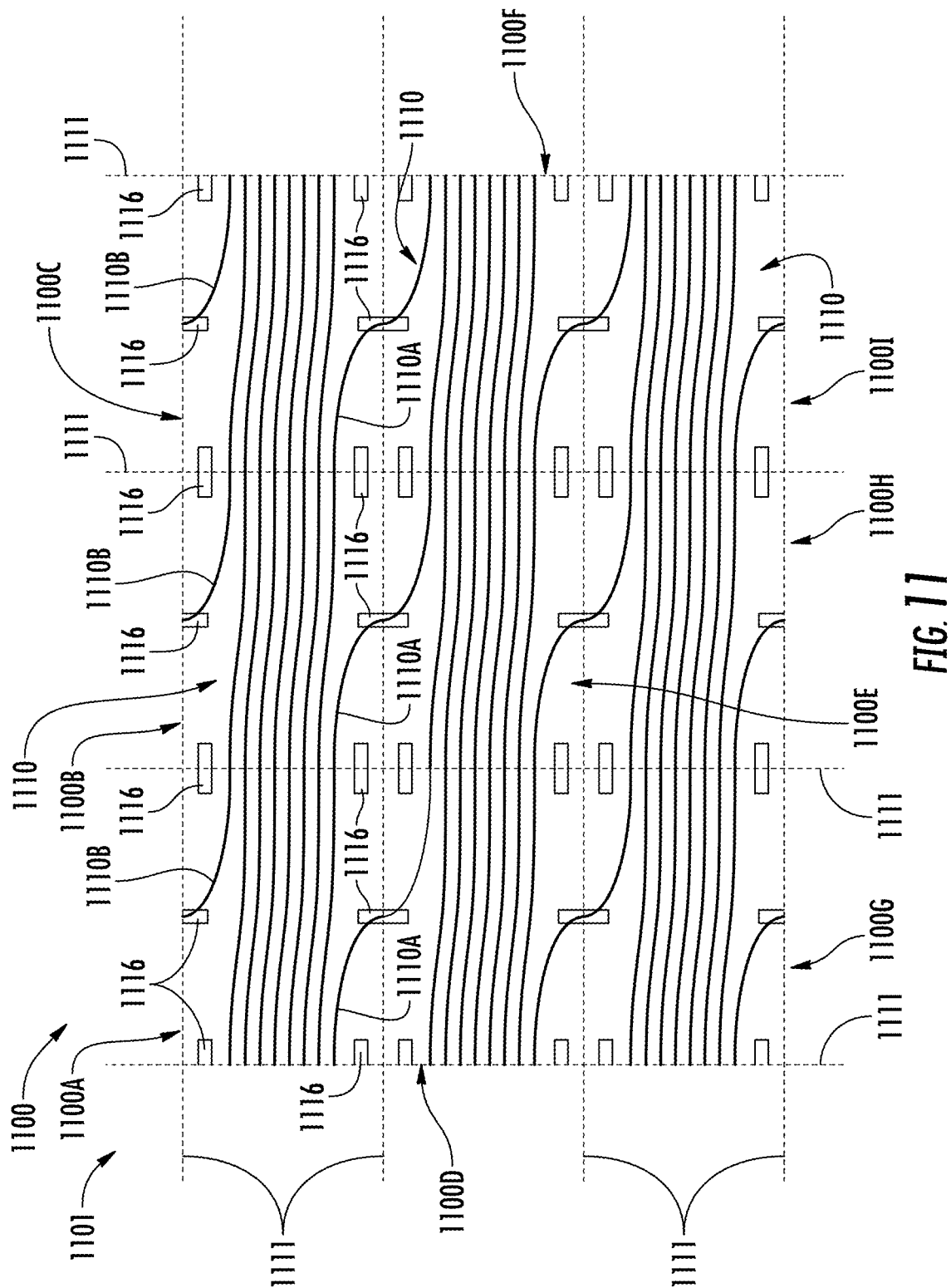
FIG. 11 schematically depicts a plurality of waveguides substrates formed on a common sheet for bulk processing.

FIG. 11 schematically depicts an explanatory example of a plurality of waveguides substrates 1100A-1100I formed on a common substrate for bulk processing prior to dicing the individual waveguide substrate. As shown in the layout, some of the pin bores 1116 may be aligned on the dicing lines 1111 (represented by the dashed lines) for allowing the continuous formation of waveguides 1110A across the dicing lines, thereby resulting in improved processing efficiency. Moreover, the layout may also allow for the continuous formation of waveguides 1110B across multiple waveguide substrates as represented by FIG. 11. Of course, other layouts of multiple waveguide substrates are possible on a common substrate for bulk processing according to the concepts disclosed.

It should now be understood that embodiments of the present disclosure are directed to waveguide substrates, waveguide substrate connector assemblies and methods of fabricating waveguide substrates having integrated waveguides providing waveguide indexing. The layout of waveguides described herein provides flexible routing of optical signals in a compact, integrated block of glass (or other suitable material). It takes full advantage of the three-dimensional nature of laser writing of waveguides to enable multiple input and output locations within a single waveguide substrate. Embodiments allow for the adding of waveguide channels in an integrated and simple fashion. The location of the add/drop waveguides can be on any of the six sides of the rectangular waveguide substrate, but preferably on sides adjacent to the through waveguides to allow for fiber optic connectors to be attached. Further, the waveguides are ideally located in the center of the sides/ends to provide maximum space for connector attachment.

Further, the waveguide substrates described herein are modular, i.e., able to be concatenated so that waveguides passing through one glass can be dropped in a sequent waveguide substrate. The waveguide substrates may be identical and interchangeable. Additionally, the same laser can create alignment features, such as blind holes or V-grooves either adjacent to the waveguides or directly in front of the waveguides, so that the relative positive of the two are accurately registered with respect to each other. These holes or grooves can accept a connector protrusion or alignment pin so that fibers are accurately aligned with their corresponding waveguide. Alternatively, they can accept a fiber ferrule. In some embodiments, the same laser additional alignment features may aid in the overmolding of a polymer that provides mechanical latching function for optical connectors. Placement accuracy is not as stringent but a fully integrated waveguide substrate with mechanical polymer housing provides a compact and easy to use part.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A waveguide substrate comprising:
   a first surface and a second surface;
   a plurality of waveguides within the waveguide substrate, wherein the plurality of waveguides defines a plurality of inputs at the first surface and extend to the second surface to define a plurality of outputs at the second surface, wherein the plurality of outputs at the second surface are arranged in a plurality of output pair; and
   at least one alignment feature cooperating with the plurality of inputs or some of the plurality of outputs, wherein the at least one alignment feature comprises a pin bore having at least one slot extending from the pin bore to a surface of the waveguide substrate.

2. The waveguide substrate of claim 1, wherein at least some of the plurality of waveguides change position within the waveguide structure.

3. The waveguide substrate of claim 1, wherein some of the plurality of waveguides are no longer adjacent to same waveguides at the second surface compared with the adjacent waveguides at the first surface.

4. The waveguide substrate of claim 1, the waveguide substrate comprises a spaced-apart zone where the waveguides change elevations in the waveguide substrate.

5. The waveguide substrate of claim 1, wherein the at least one alignment feature comprises a first alignment feature and a second alignment feature.

6. The waveguide substrate of claim 1, wherein the first surface is opposite of the second surface.

7. The waveguide substrate of claim 1, wherein the pin bore has a diameter that is greater than a thickness of the waveguide substrate.

8. The waveguide substrate of claim 1, wherein the pin bore comprises a main portion and a tapered entrance portion.

9. The waveguide substrate of claim 1, further comprising a vertical hole through the at least one first slot and the pin bore.

10. A waveguide substrate comprising:
a first surface and a second surface;
a plurality of waveguides within the waveguide substrate, wherein:
the plurality of waveguides defines a plurality of inputs at the first surface;
a subset of the plurality of waveguides extend to the second surface to at least partially define a plurality of outputs at the second surface;
at least one branching waveguide extending between the first surface to a surface other than the second surface,
wherein the at least one branching waveguide is a drop-waveguide;
an add-waveguide extending between the second surface and a surface other than the first surface;
a first input alignment feature and a second input alignment feature within the first surface, wherein the plurality of inputs is disposed between the first input alignment feature and the second input alignment feature; and
a first output alignment feature and a second output alignment feature within the second surface, wherein the plurality of outputs is disposed between the first output alignment feature and the second output alignment feature.

11. The waveguide substrate of claim 10, wherein the second surface is opposite from the first surface.

12. The waveguide substrate of claim 10, wherein a number of inputs at the first surface is equal to a number of outputs at the second surface.

13. The waveguide substrate of claim 10, wherein the waveguide substrate comprises a drop ferrule bore at a third surface of the waveguide substrate such that an output of the drop-waveguide is at the drop ferrule bore.

14. The waveguide substrate of claim 10, wherein:
the drop-waveguide extends between the first surface and a third surface of the waveguide substrate;
the add-waveguide extends between the second surface and a fourth surface of the waveguide substrate; and
the third surface is opposite from the fourth surface.

15. The waveguide substrate of claim 14, wherein:
the waveguide substrate comprises a first drop pin bore and a second drop pin bore at the third surface such that an output of the drop-waveguide is disposed between the first drop pin bore and the second drop pin bore; and
the waveguide substrate comprises a first add pin bore and a second add pin bore at the fourth surface such that an input of the add-waveguide is disposed between the first add pin bore and the second add pin bore.

16. The waveguide substrate of claim 14, wherein:
the waveguide substrate comprises a ferrule drop bore at the third surface such that an output of the drop-waveguide is disposed within the drop ferrule bore; and
the waveguide substrate comprises an add ferrule bore at the fourth surface such that an input of the add-waveguide is disposed within the add ferrule bore.

17. The waveguide substrate of claim 10, wherein: each waveguide of the plurality of waveguides extending from the first surface to the second surface has an input position and an output position; and the output position of each waveguide is indexed from the input position by the number of branching waveguides.

18. The waveguide substrate of claim 10, wherein:
the second surface is opposite to the first surface;
the at least one branching waveguide comprises:
at least one first branching waveguide extending between the first surface and a third surface of the waveguide substrate;
at least one second branching waveguide extending between the first surface and a fourth surface of the waveguide substrate; and
at least one third branching waveguide extending between the first surface and a fifth surface of the waveguide substrate;
at least one fourth branching waveguide extending between the first surface and a sixth surface of the waveguide substrate;
the third surface is opposite the fourth surface; and
the fifth surface is opposite the sixth surface.

19. The waveguide substrate of claim 10, wherein one or more of the first input alignment feature, the second input alignment feature, the first output alignment feature and the second output alignment feature comprises a groove.

20. The waveguide substrate of claim 19, wherein the groove comprises a main portion a tapered entrance portion.

21. The waveguide substrate of claim 19, further comprising at least one cover disposed on at least one groove.

22. The waveguide substrate of claim 10, wherein one or more of the first input alignment feature, the second input alignment feature, the first output alignment feature and the second output alignment feature comprises a pin bore.

23. The waveguide substrate of claim 22, wherein the pin bore has a diameter that is greater than a thickness of the waveguide substrate.

24. The waveguide substrate of claim 23, wherein the pin bore comprises a main portion and a tapered entrance portion.

25. The waveguide substrate of claim 23, further comprising at least one slot extending from the pin bore to a surface of the waveguide substrate.

26. The waveguide substrate of claim 25, further comprising a vertical hole through the at least one first slot and the pin bore.

27. The waveguide substrate of claim 25, further comprising an additional vertical slot through the at least one first slot and the pin bore.

28. The waveguide substrate of claim 25, wherein the at least one slot comprises a first slot and a second slot, and the waveguide substrate further comprises:
- a first additional slot disposed on a first side of the pin bore; and
- a second additional slot disposed on a second side of the pin bore.

29. The waveguide substrate of claim 28, further comprising:
- a third slot extending from the pin bore to the first additional slot; and
- a fourth slot extending from the pin bore to the second additional slot.

30. A waveguide substrate comprising:
- a first surface and a second surface;
- a plurality of waveguides within the waveguide substrate, wherein:
  - the plurality of waveguides defines a plurality of inputs at the first surface;
  - a subset of the plurality of waveguides extend to the second surface to at least partially define a plurality of outputs at the second surface; and
  - at least one branching waveguide extending between one of the first surface and the second surface to a surface other than the first surface and the second surface,
- a first input alignment feature and a second input alignment feature within the first surface, wherein the plurality of inputs is disposed between the first input alignment feature and the second input alignment feature; and
- a first output alignment feature and a second output alignment feature within the second surface, wherein the plurality of outputs is disposed between the first output alignment feature and the second output alignment feature,
- wherein the at least one branching waveguide comprises:
  - at least one first drop-waveguide extending from the first surface to a third surface of the waveguide substrate;
  - at least one second drop-waveguide extending from the first surface to a fourth surface of the waveguide substrate opposite from the third surface;
  - at least one third drop-waveguide extending from the first surface to a fifth surface of waveguide substrate; and
  - at least one fourth drop-waveguide extending from the first surface to a sixth surface of the waveguide substrate opposite from the fifth surface.

31. The waveguide substrate of claim 30, further comprising a first drop pin bore and a second drop pin bore adjacent to each of an output of the at least one first drop-waveguide at the third surface, an output of the at least one second drop-waveguide at the fourth surface, an output of the at least one third drop-waveguide at the fifth surface, and an output of the at least one fourth drop-waveguide at the sixth surface.

32. The waveguide substrate of claim 31, further comprising:
- the waveguide substrate comprises a drop ferrule bore at the third surface such that an output of the drop-waveguide is disposed within the drop ferrule bore; and
- the waveguide substrate comprises an add ferrule bore at the fourth surface such that an input of the add-waveguide is disposed within the add ferrule bore.

* * * * *

UNITED STATES PATENT AND TRADEMARK OFFICE
CERTIFICATE OF CORRECTION

| | |
|---|---|
| PATENT NO. | : 11,256,042 B2 |
| APPLICATION NO. | : 17/030834 |
| DATED | : February 22, 2022 |
| INVENTOR(S) | : Evans et al. |

It is certified that error appears in the above-identified patent and that said Letters Patent is hereby corrected as shown below:

In the Claims

In Column 20, Line 46, in Claim 20, delete "portion a" and insert -- portion and a --.

Signed and Sealed this
Thirty-first Day of May, 2022

Katherine Kelly Vidal
*Director of the United States Patent and Trademark Office*